Jan. 17, 1967    G. M. PAVEY, JR., ET AL    3,299,397
UNDERWATER DETECTOR STREAMER APPARATUS FOR
IMPROVING THE FIDELITY OF
RECORDED SEISMIC SIGNALS
Filed March 8, 1965                          17 Sheets-Sheet 3
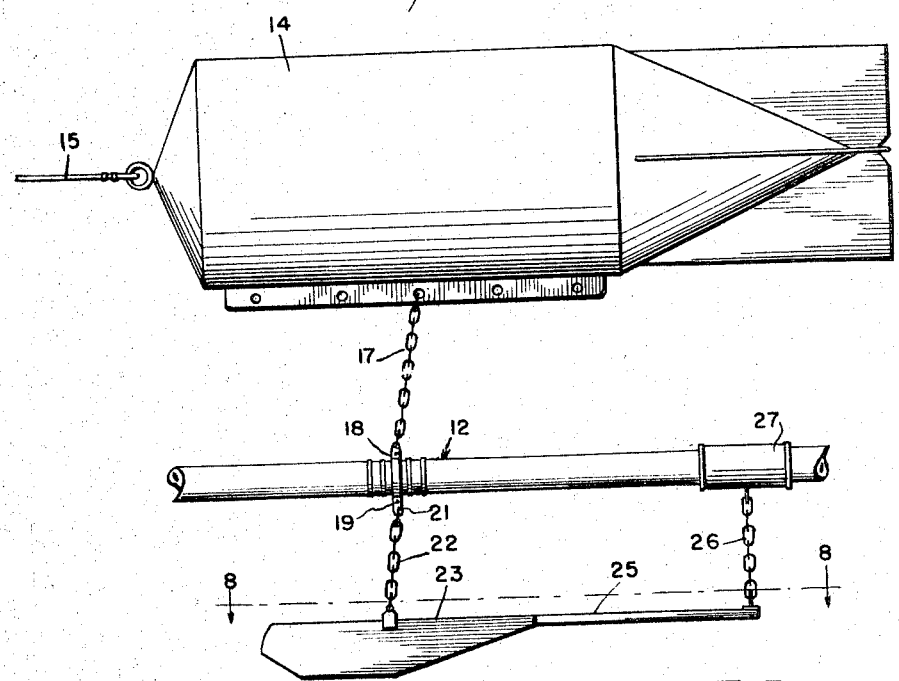
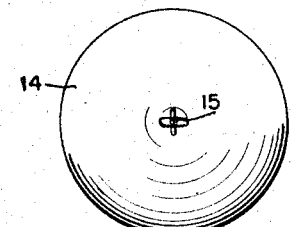
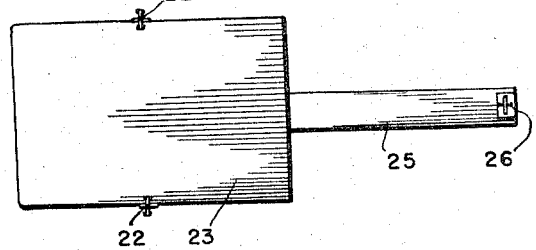
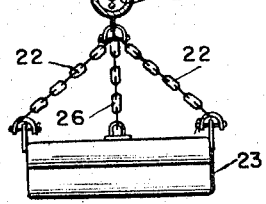
INVENTORS
G. M. PAVEY, JR.
R. H. PEARSON

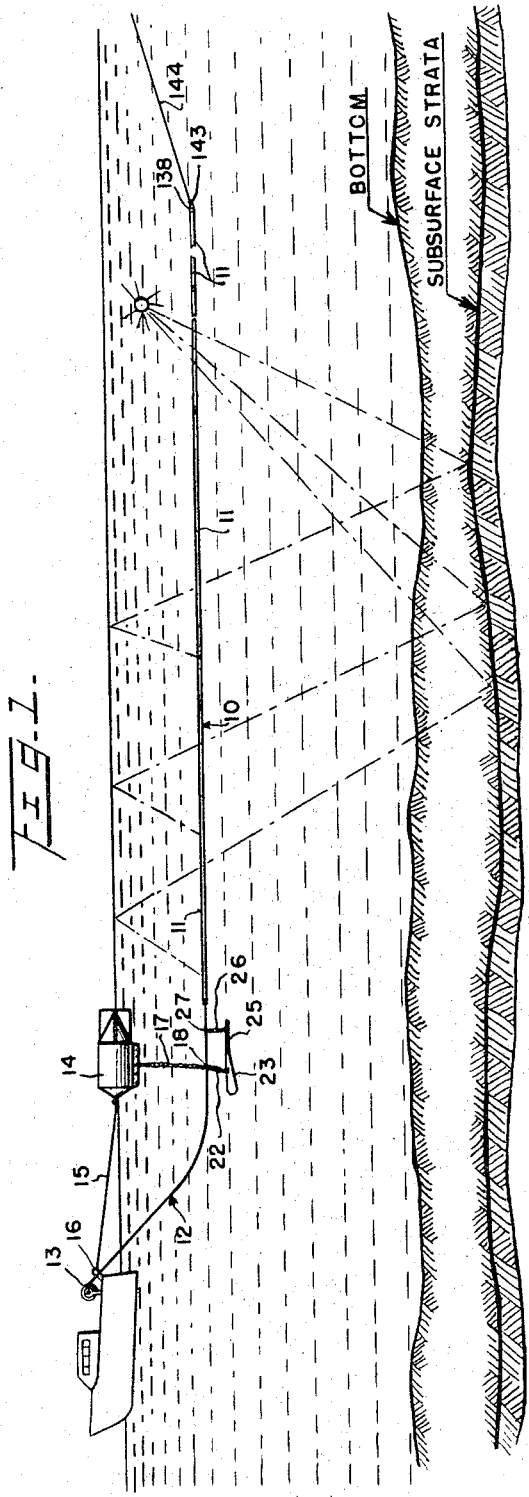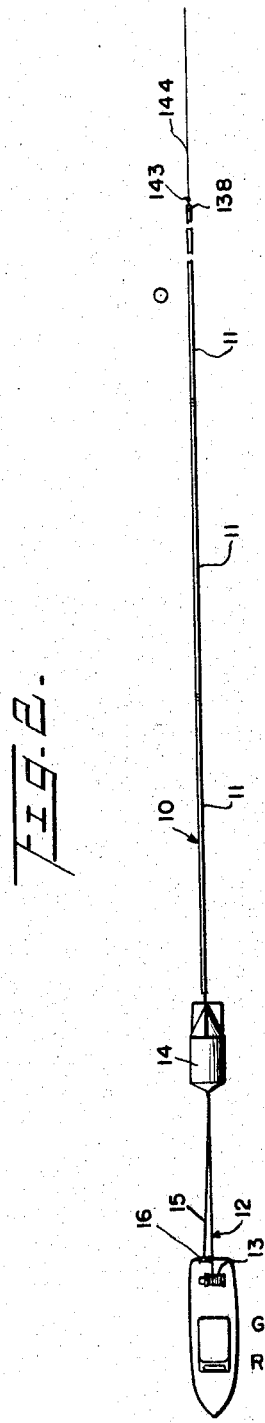

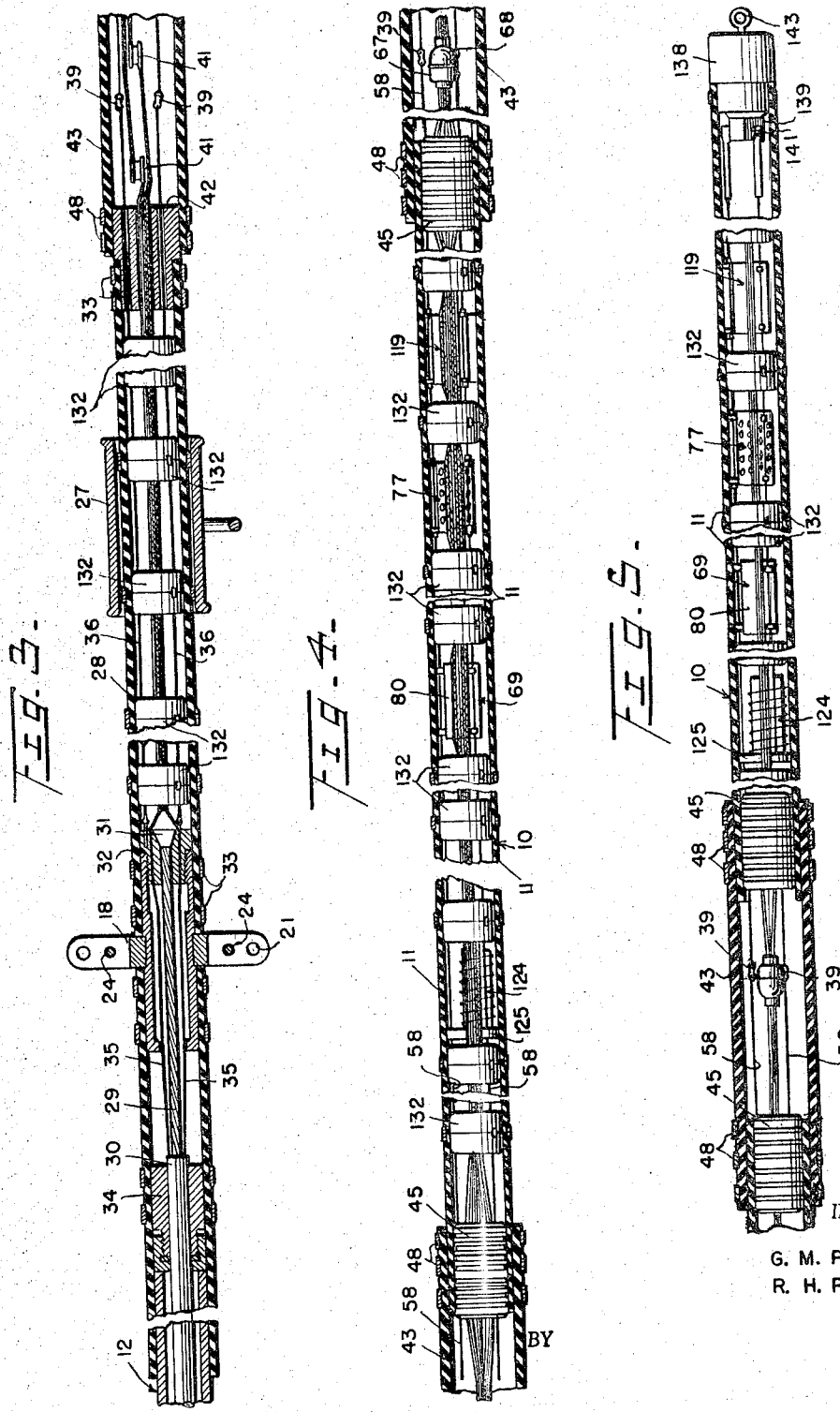

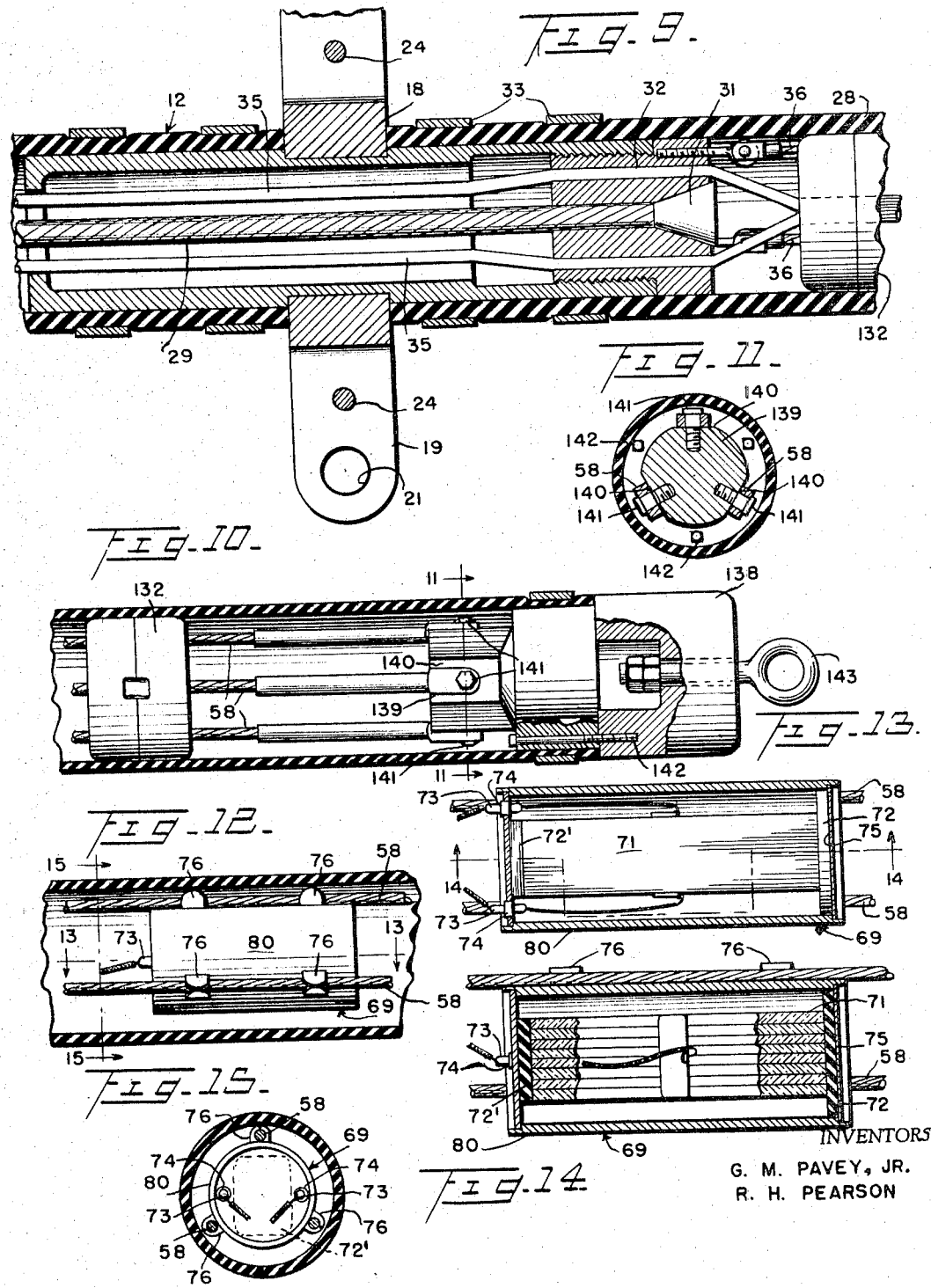

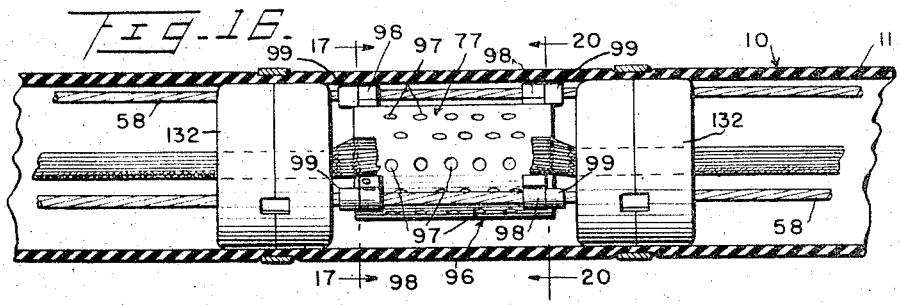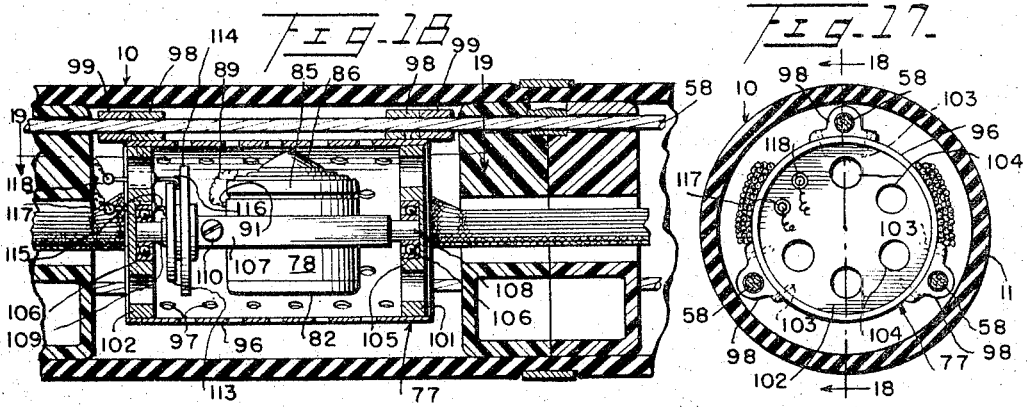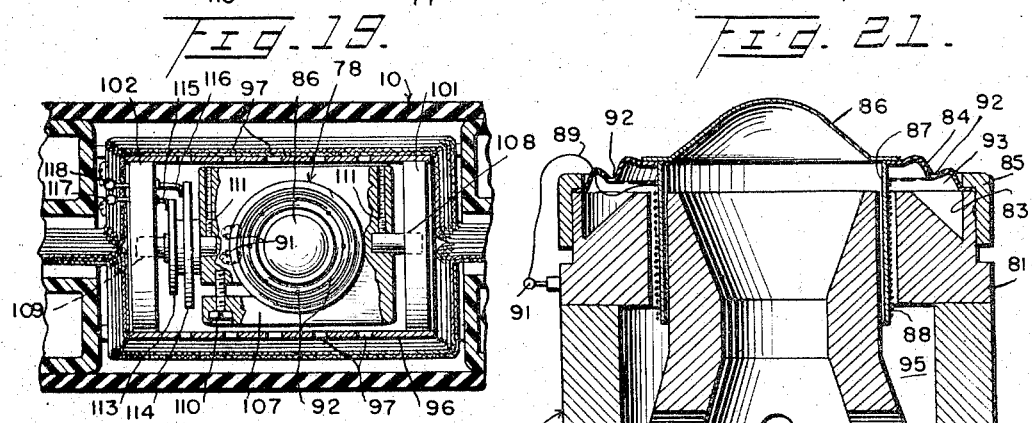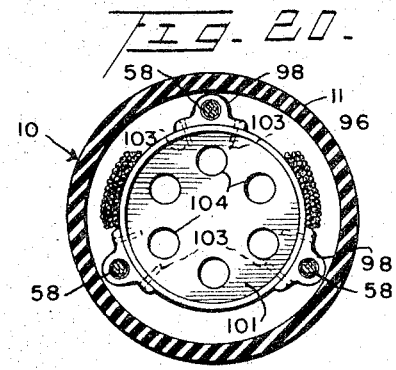

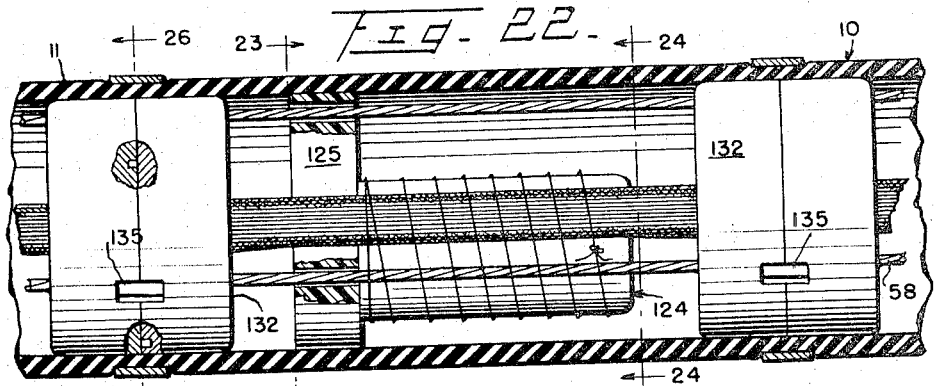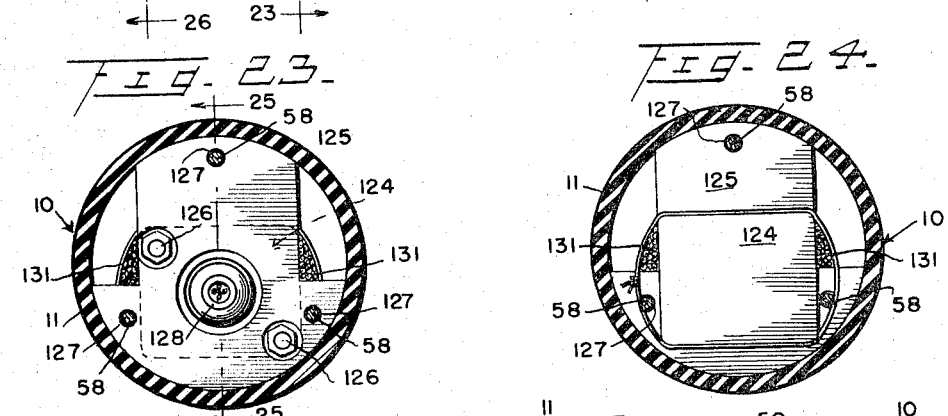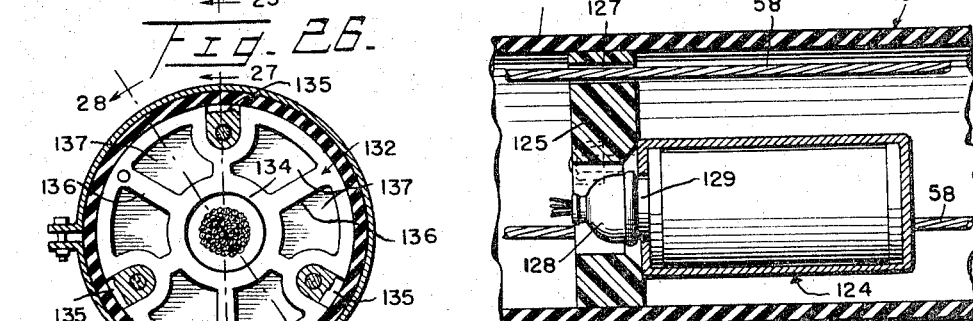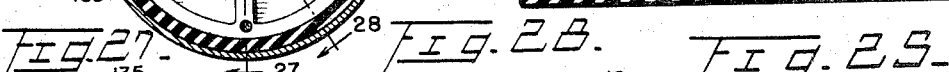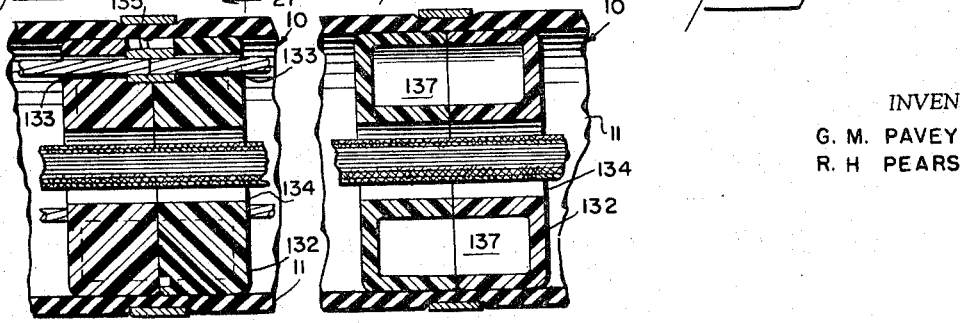
INVENTORS
G. M. PAVEY, JR.
R. H. PEARSON

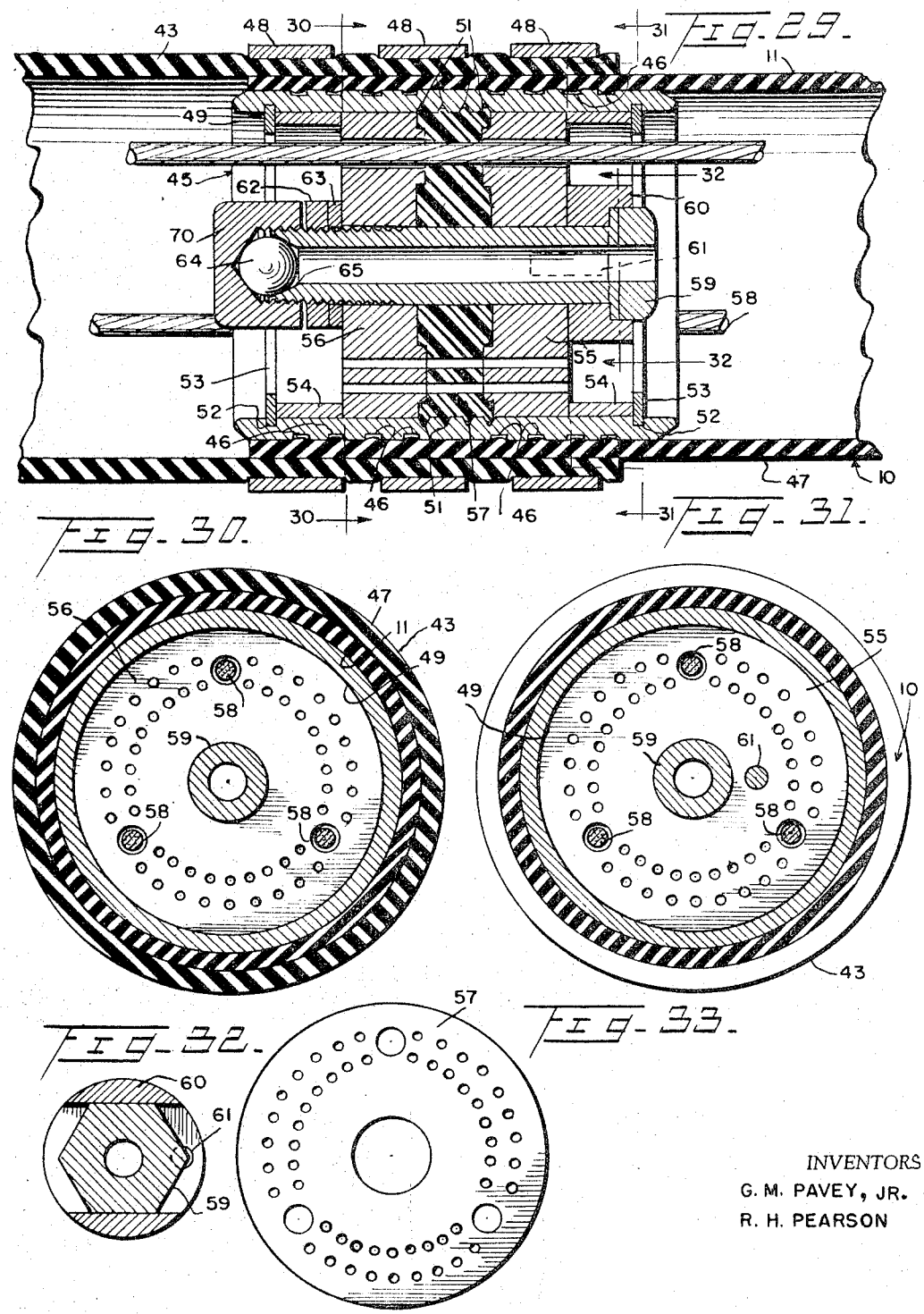

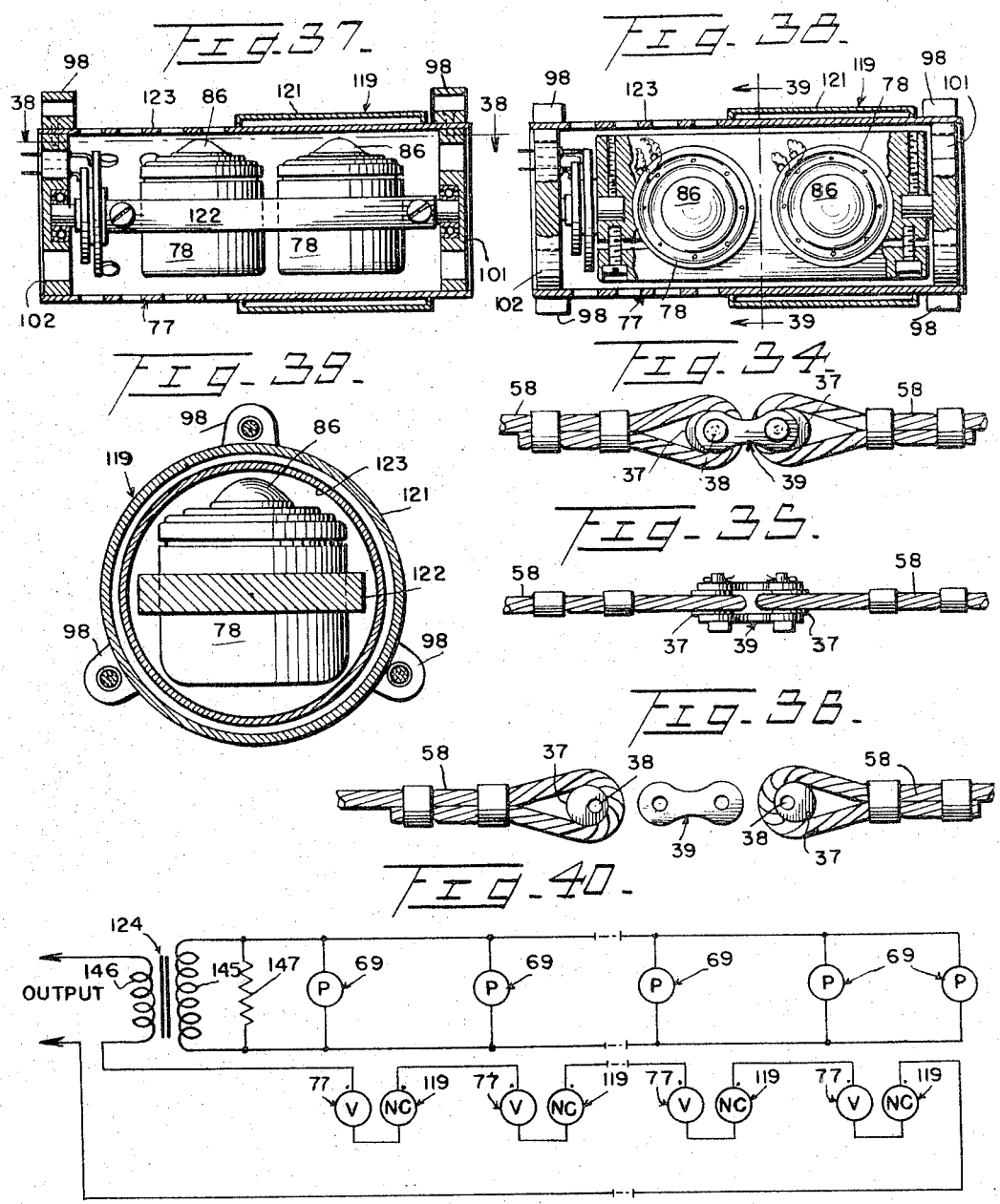

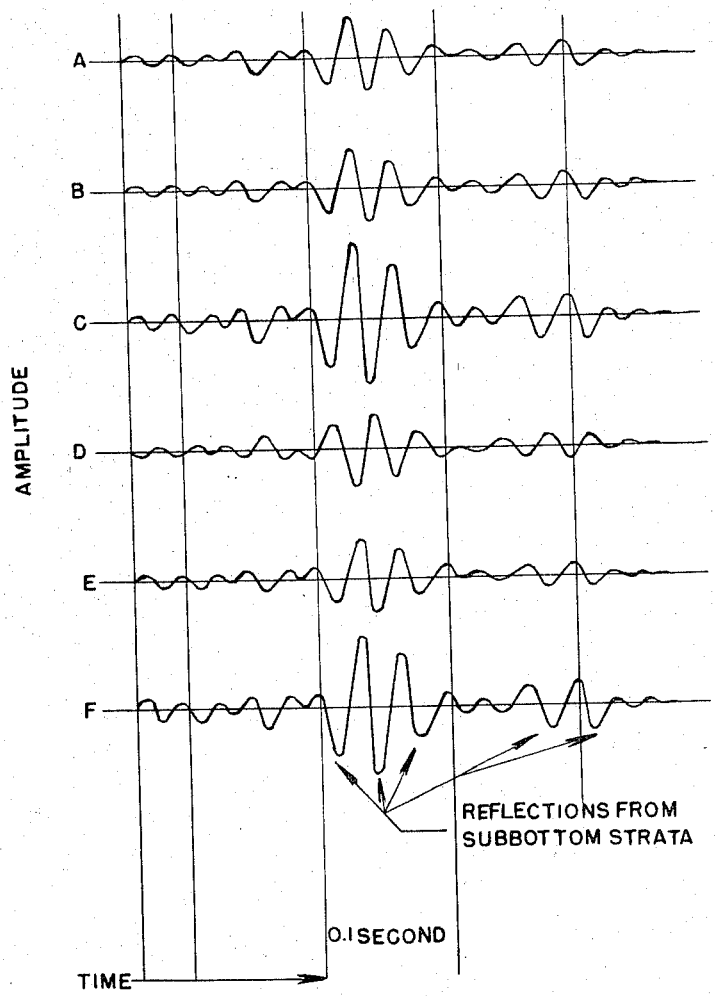

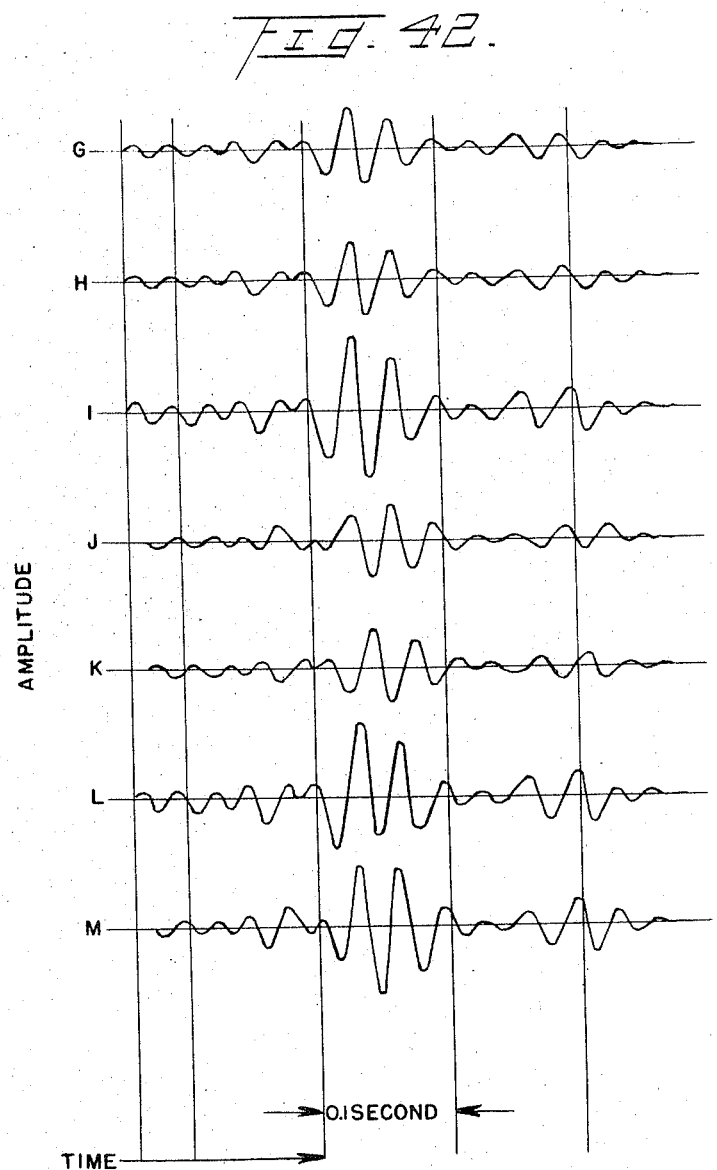

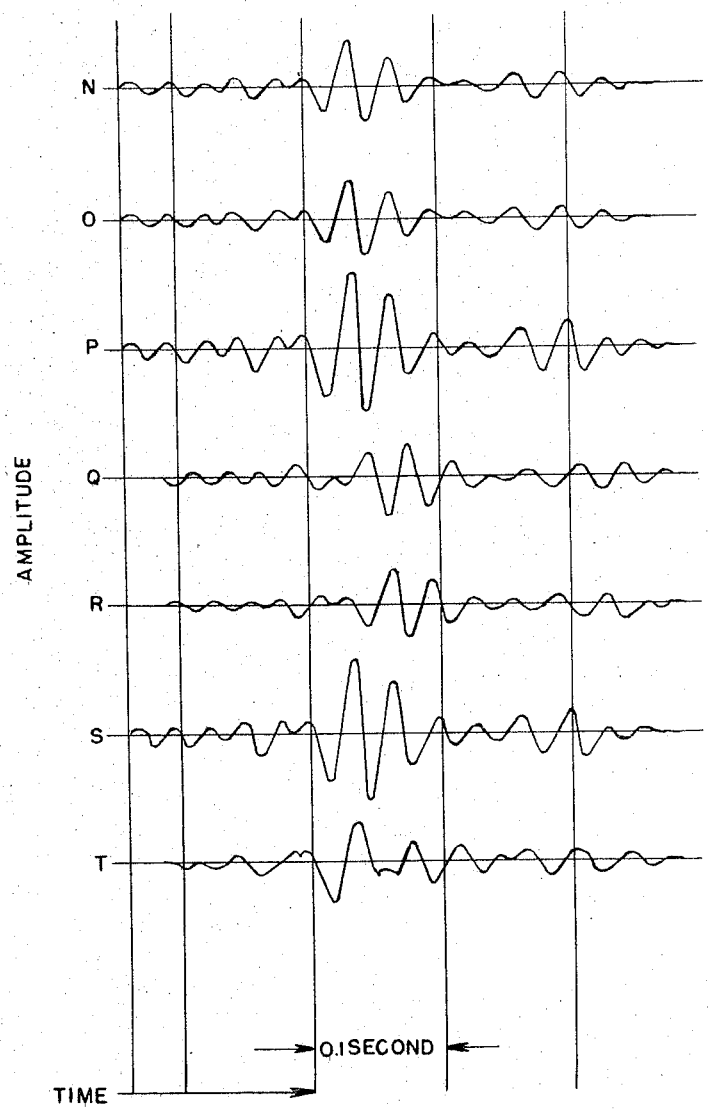

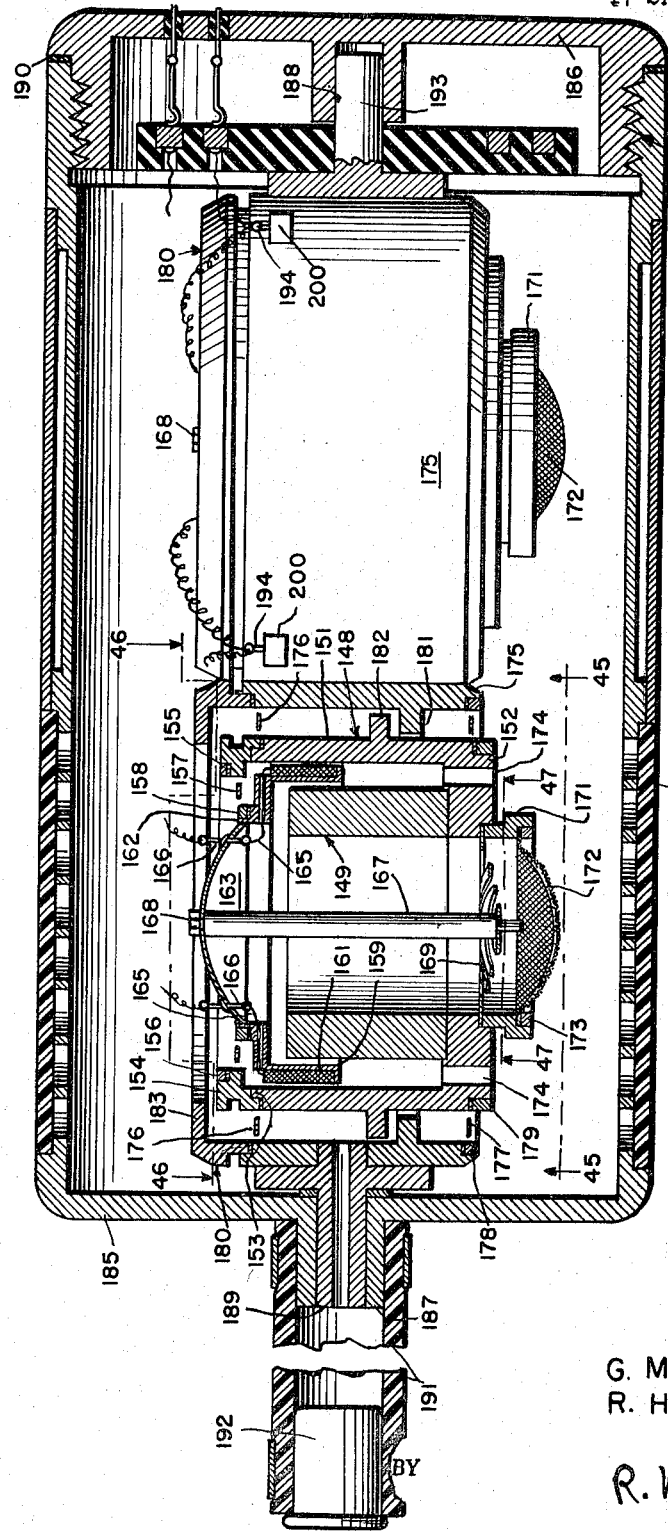

INVENTORS
G. M. PAVEY, JR.
R. H. PEARSON

R. M. Hicks
ATTORNEY

Jan. 17, 1967 G. M. PAVEY, JR., ET AL 3,299,397
UNDERWATER DETECTOR STREAMER APPARATUS FOR
IMPROVING THE FIDELITY OF
RECORDED SEISMIC SIGNALS
Filed March 8, 1965 17 Sheets-Sheet 14
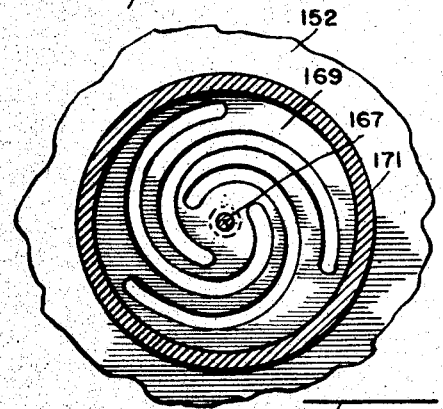
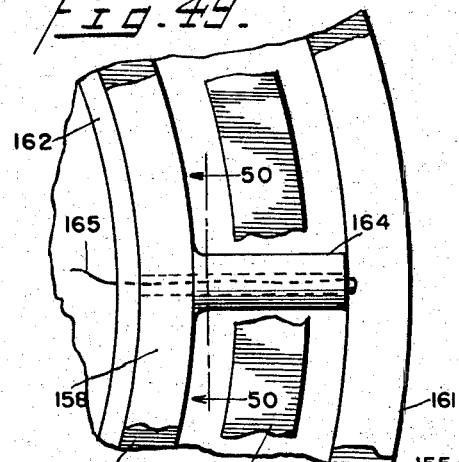
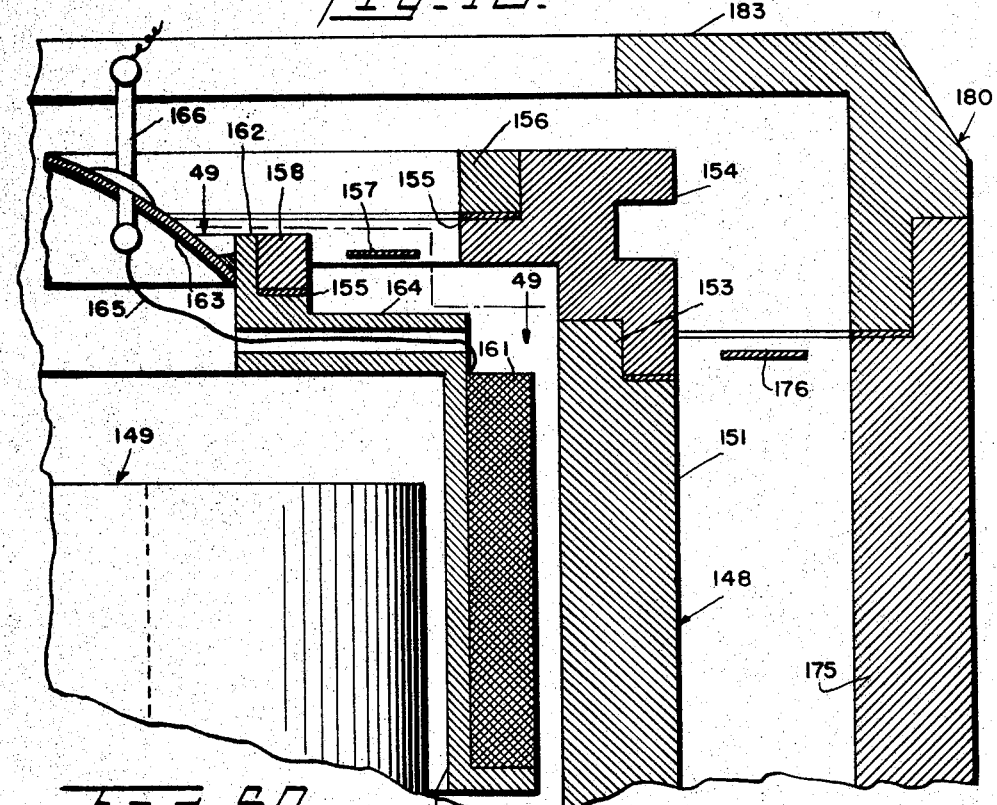
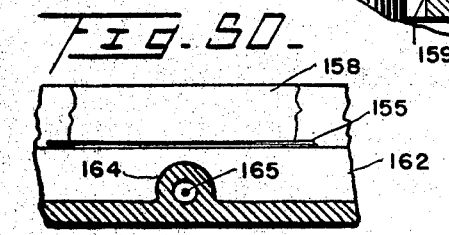
INVENTORS
G. M. PAVEY, JR.
R. H. PEARSON
BY R. M. Hicks
ATTORNEY

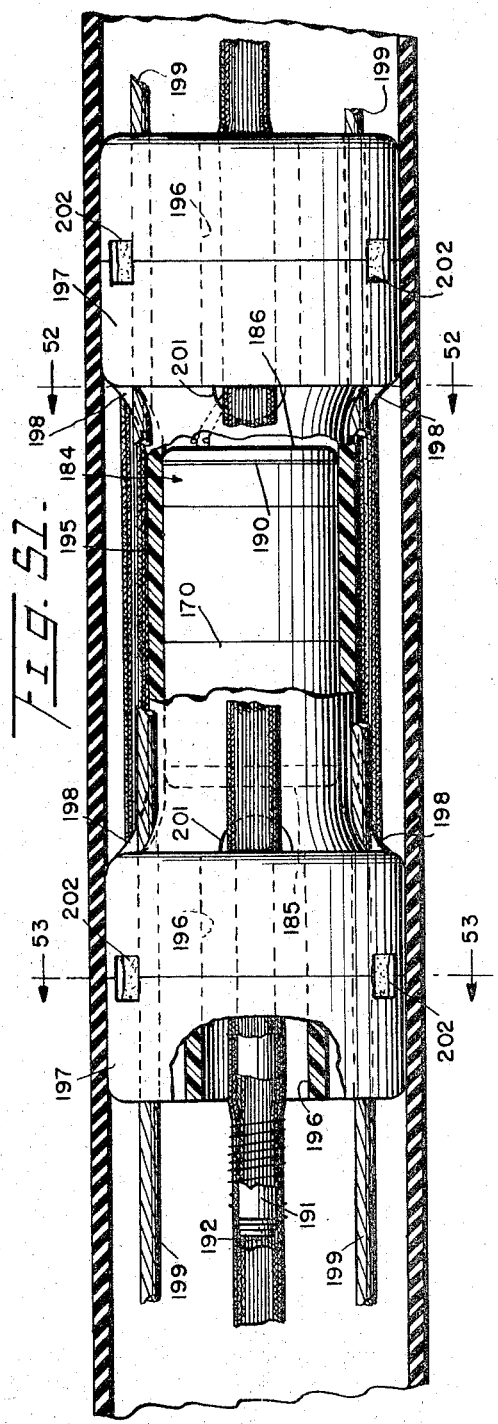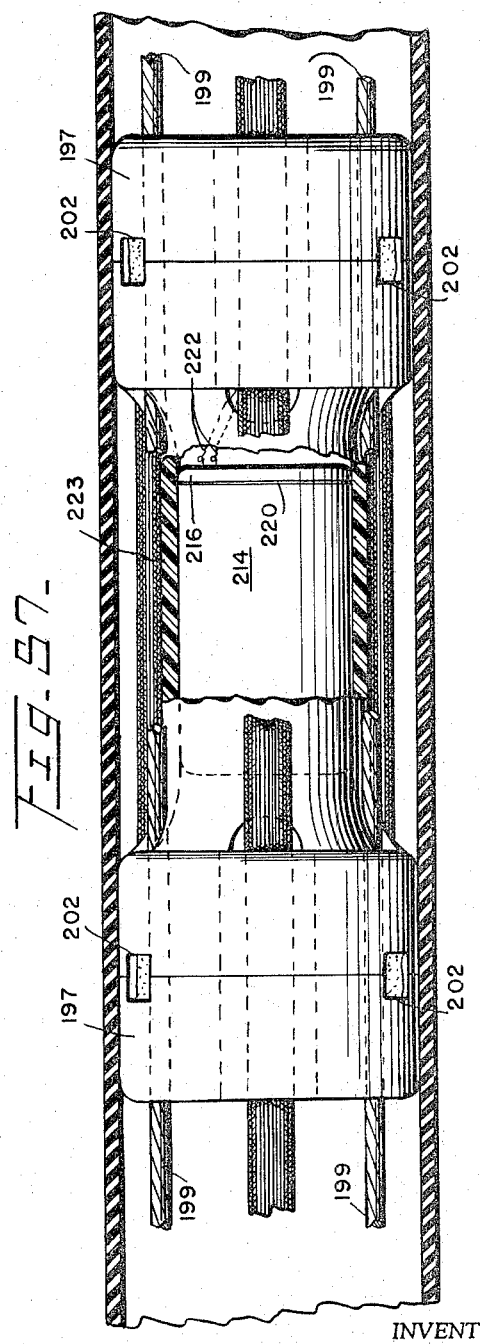

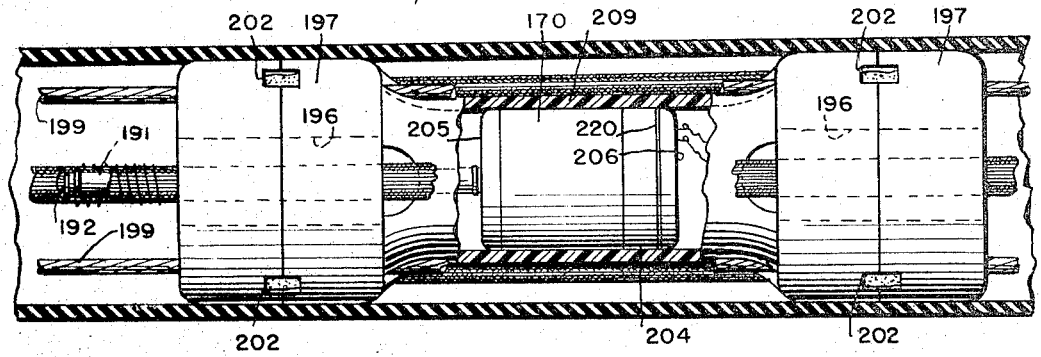
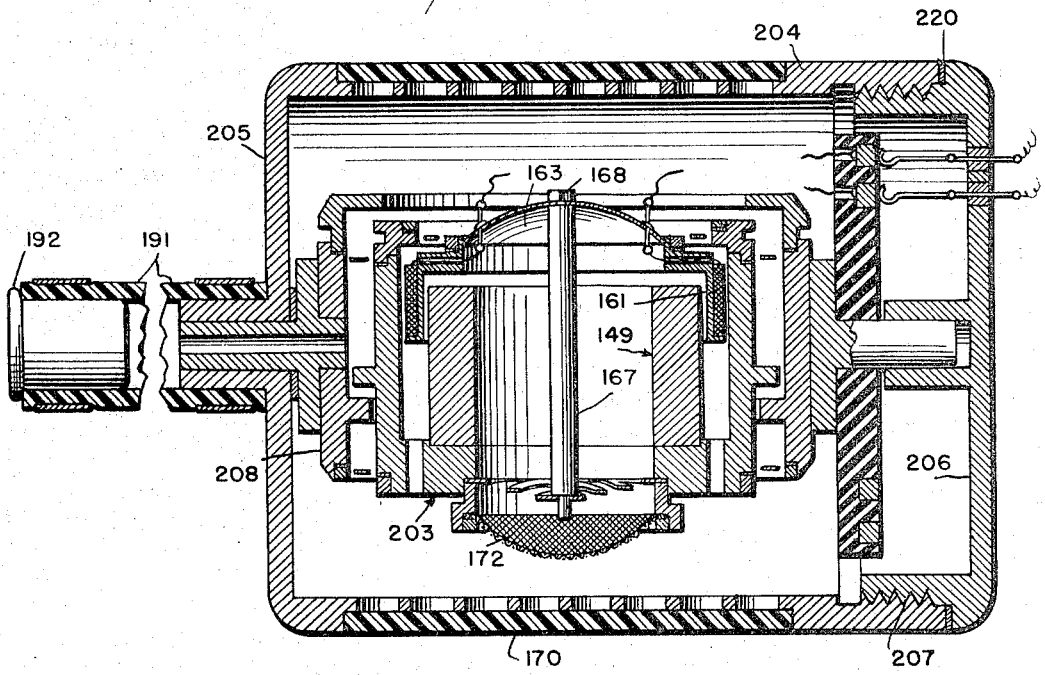

_United States Patent Office_

3,299,397
Patented Jan. 17, 1967

3,299,397
UNDERWATER DETECTOR STREAMER APPARATUS FOR IMPROVING THE FIDELITY OF RECORDED SEISMIC SIGNALS
George M. Pavey, Jr., Dallas, and Raymond H. Pearson, Richardson, Tex., assignors to Sonic Engineering Company, Dallas, Tex.
Filed Mar. 8, 1965, Ser. No. 439,136
17 Claims. (Cl. 340—7)

This invention relates to a method and waterborne apparatus for making a high fidelity seismic survey of water covered areas and more particularly to a new and improved oil filled streamer immersed within the water for improving the character of the seismic signal reflected from subaqueous geological formations in response to an acoustical impulse within the water and picked up by a plurality of detecting devices disposed within the streamer while the streamer is towed by a vessel along a predetermined course, the improvement in the seismic signal resulting from the elimination of spurious signals reflected downwardly from the air-water interface and other random noise signals received by the detectors, regardless of the depth of submersion of the streamer.

This is in part a continuation of our application for Method and Underwater Detector Streamer Apparatus for Improving the Fidelity of Recorded Seismic Signals, Serial Number 344,670, filed February 13, 1964.

It has been the usual practice, heretofore, in modern systems of this character such, for example, as the system for Method and Means for Surveying Geological Formations disclosed and claimed in Patent 2,465,696, issued March 29, 1949, to Le Roy C. Paslay, to receive the seismic signals by a plurality of pressure responsive detectors disposed within a streamer and towed through the water by a vessel. While such a system has been generally satisfactory in service, it also receives secondary signals reflected from the surface of the water as the result of a mismatch of acoustical impedance at the air-water interface which may distort and otherwise adversely affect the seismic signals received by the detectors from the subsurface terrestrial structure from which the seismic signals are reflected. Since the pressure wave undergoes a 180-degree phase shift when reflected at the air-water interface nearly total cancellation of the seismic signal may result if the streamer is towed too near the surface. This condition has made it necessary heretofore for pressure detecting streamers to be operated at substantially a predetermined depth below the surface such, for example, as thirty feet for optimum results. This depth corresponds to one-quarter wave length of the seismic signal. Variations in the depth of the streamer from this predetermined depth, however, are accompanied by a deterioration of the recorded seismic signal caused by the effects of the secondary wave reflection from the surface of the water. In practice, it has been found that the streamer depth does not remain constant throughout the length thereof due to oil leaks in the streamer, temperature variations, speed fluctuations and other causes, particularly when, as is sometimes the case, the length of the streamer is in excess of 2700 feet from the head to the tail end.

An additional disadvantage resides in the fact that whenever the character of the signal changes from location to location corresponding to different shot points, the timing of the signal also changes. To measure time on the signal recording chart it is necessary that there be a consistent correlation of signals from location to location of the streamer as the explosive shots are fired in successive order. An accurate measure of these times and either assumed or known propagation velocities is essential to the preparation of an accurate map of the subbottom strata surveyed by the streamer. The downwardly reflected secondary signals have, in certain cases, seriously impaired the seismic signals detected by the pressure type detectors to such an extent that the seismologist has experienced considerable difficulty in recognizing and interpreting the recorded graphs of the seismic signals.

The system of the present invention possesses all of the advantages of the prior systems employing pressure type detectors disposed within an elongated flexible oil filled streamer immersed within the water and none of the foregoing disadvantages.

In accordance with the teaching of the present invention the detection streamer is provided with a plurality of particle velocity sensing detectors or phones arranged within the streamer and interspersed with the pressure detector phones disposed therein, the electrical outputs of the velocity and pressure phones being connected in such a manner that the character of the seismic signal reflected from the subbottom strata and received by the pressure phones is not adversely affected by the reflected secondary wave from the air-water interface. The invention also contemplates a second group of velocity sensitive phones within the streamer electrically connected to the particle velocity responsive phones in a manner to cancel out unwanted signals due to motional disturbances generated by residual inertia effects.

An arrangement is thus provided in which the character of the recorded seismic wave corresponding to the signal reflected from the subbottom strata upwardly toward the submerged streamer is unaltered by the signal reflected downwardly toward the streamer from the air-water interface and, if desired, noise effects from unwanted motional causes are eliminated. The manner in which this desirable result is achieved will be more clearly apparent as the description proceeds.

One of the objects of the present invention is to provide an elongated flexible detection streamer adapted to be towed at various depths of submersion beneath the surface of a body of water and having means therein for producing a high fidelity output electrical signal correlative with the character of a seismic wave reflected from subbottom strata beneath the streamer and for excluding from the output electrical signal the adverse effects of a secondary wave reflected downwardly from the air-water interface and impinging on the streamer regardless of the depth of submersion of the streamer.

Another object is to provide a discriminating type of detection streamer for underwater surveying having means therein for rendering the streamer responsive to seismic waves approaching the streamer from below and substantially unresponsive to downwardly approaching waves reflected from the surface of the water at the air-water interface.

Still another object is the provision of a new and improved flexible oil filled streamer for a marine seismic system having a plurality of pressure responsive detectors and a plurality of particle velocity responsive devices therein so connected as to provide an electrical output signal correlative with the character of a seismic wave reflected from the subbottom strata and to be unresponsive to wave movement of the water caused by secondary reflections of the seismic wave from the surface of the water in a manner to prevent deterioration of the seismic signal as a result of the acoustical impulses caused by the waves reflected downwardly from the air-water interface and sensed by the pressure responsive detectors.

A further object resides in a new and improved oil filled detection streamer submersible at different depths within the water and having means for generating an electrical output seismic signal correlative with a seismic wave reflected by the subbottom strata beneath the streamer, and having new and improved particle velocity responsive means within the streamer for preventing deterioration of the seismic signal by reflections of the seismic wave from the surface of the water and additional means included within the streamer for canceling the inertia effects on the particle velocity means resulting from unwanted motional disturbance of the streamer.

A still further object of this invention is to provide a method and apparatus for canceling a secondary seismic wave reflected downwardly from the surface of the water by the use of a plurality of particle velocity detectors arranged within an oil filled streamer submerged within the water and interspersed with a plurality of pressure sensing detectors within the streamer and connected thereto in such manner that the output character of the pressure sensing detectors corresponds with a high degree of fidelity to the character of the primary seismic wave reflected from the subbottom strata beneath the streamer unmutilated by secondary wave reflections and regardless of the depth of submersion of the streamer.

Another object is to provide new and improved structure for increasing the sensitivity of response of the instantaneous particle velocity sensing detectors arranged within a submerged flexible oil filled streamer while a towing force is applied thereto.

Still other objects, advantages and improvements will be apparent from the following description, taken in connection with the accompanying drawings of which:

FIG. 1 is a diagrammatic view of the system of the present invention in accordance with a preferred embodiment thereof in which the detection streamer is being towed by a vessel and the velocity and pressure waves reflected from the subbottom and the air-water interface is shown in dashed outline;

FIG. 2 is a plan view of the system of FIG. 1;

FIG. 3 is an enlarged sectional view partially in section of the tow cable and head end of the detection streamer of FIG. 1;

FIG. 5 is an enlarged sectional view of the trailing end of the streamer;

FIG. 6 is an enlarged elevational view of the float and depressor arrangement of FIG. 1;

FIG. 7 is an end view of the device of FIG. 6;

FIG. 8 is a view of the depressor taken along the line 8—8 of FIG. 6;

FIG. 9 is an enlarged detail view in section of the trailing end of the towing line illustrating the connections to the streamer, float and depressor;

FIG. 10 is an enlarged detail sectional view of the trailing end of the streamer;

FIG. 11 is a view taken substantially along the line 11—11 of FIG. 10;

FIG. 12 is a view partially in section of one of the pressure responsive devices mounted within the streamer;

FIG. 13 is an enlarged sectional view taken substantially along the line 13—13 of FIG. 12;

FIG. 14 is a view similar to FIG. 13 taken substantially along the line 14—14 of FIG. 13;

FIG. 15 is a view taken substantially along the line 15—15 of FIG. 12;

FIG. 16 is an enlarged view of one of the particle velocity detectors mounted within the streamer;

FIG. 17 is a view somewhat enlarged taken along the line 17—17 of FIG. 16;

FIG. 18 is a view partially in section taken substantially along the line 18—18 of FIG. 17;

FIG. 19 is a view taken substantially along the line 19—19 of FIG. 18;

FIG. 20 is a view taken substantially along the line 20—20 of FIG. 16;

FIG. 21 is a sectional view greatly enlarged of the signal detecting and electrical generating mechanism employed with the particle velocity and motional responsive devices;

FIG. 22 is a view of the transformer preferably employed in the present invention and the structure for mounting the transformer between a pair of spacers;

FIG. 23 is a sectional view taken substantially along the line 23—23 of FIG. 22;

FIG. 24 is a view similar to FIG. 23 and taken along the line 24—24 of FIG. 22;

FIG. 25 is a sectional view taken substantially along the line 25—25 of FIG. 23;

FIG. 26 is a sectional view taken substantially along the line 26—26 of FIG. 22;

FIG. 27 is a view taken substantially along the line 27—27 of FIG. 26;

FIG. 28 is a view similar to FIG. 27 taken substantially along the line 28—28 of FIG. 26;

FIG. 29 is a greatly enlarged detail view of the end seal of a detector streamer and the means for filling the streamer with oil and thereafter sealing the oil within the streamer;

FIG. 30 is a sectional view taken substantially along the line 30—30 of FIG. 29;

FIG. 31 is a view taken substantially on the line 31—31 of FIG. 29;

FIG. 32 is a sectional view taken substantially on the line 32—32 of FIG. 29;

FIG. 33 is a detail view of the oil sealing gaskets employed with the device of FIG. 29;

FIG. 34 is a detail view on which is shown the ends of two successive strain cables connected together;

FIG. 35 is a plan view of the devices of FIG. 34;

FIG. 36 is a view similar to FIG. 34 with the cables disconnected;

FIG. 37 is a view of the particle velocity and noise canceling detectors according to another embodiment thereof;

FIG. 38 is a sectional view taken substantially on the line 38—38 of FIG. 37;

FIG. 39 is an enlarged sectional view taken substantially on the line 39—39 of FIG. 38;

FIG. 40 is a circuit arrangement suitable for use with the present invention;

Figure 52:
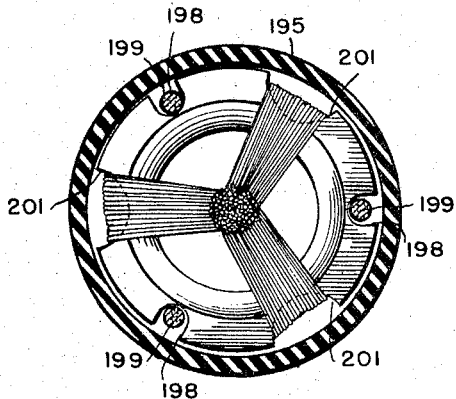
Figure 53:
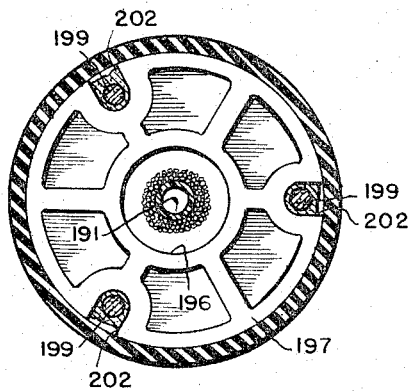
Figure 54:
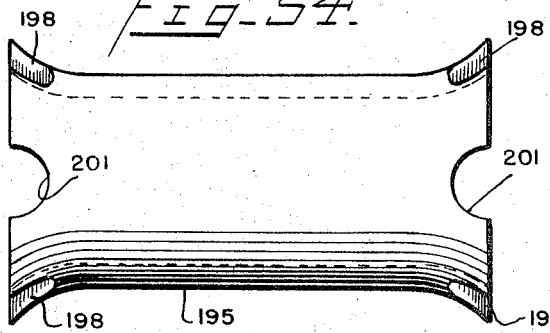
Figure 55:
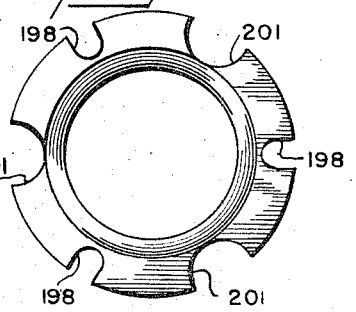
Figure 56:
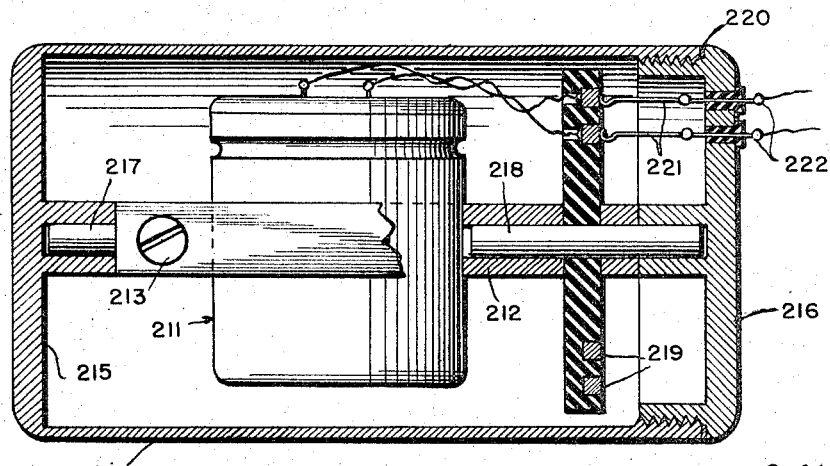

FIGS. 41, 42, and 43 are traces of pressure waves, particle velocity waves and waves due to random motional effects alone and in various combinations at depths just beneath the surface, 30 and 72 feet below the surface respectively;

FIG. 44 is an enlarged view partially in section of a particle velocity sensing device and a noise canceling device according to an alternative form of the invention;

FIG. 45 is an enlarged bottom view of one of the devices of FIG. 44 as seen from the line 45—45 of FIG. 44;

FIG. 46 is an enlarged top plan view partially in section of one of the devices of FIG. 44 as seen from the line 46—46;

FIG. 47 is a sectional view taken substantially along the line 47—47 of FIG. 44;

FIG. 48 is a greatly enlarged fragmentary sectional view of one of the devices of FIG. 44, illustrating the coil mounting and spring arrangement;

FIG. 49 is a sectional view taken substantially along the line 49—49 of FIG. 48;

FIG. 50 is a fragmentary sectional view taken substantially along the line 50—50 of FIG. 49;

FIG. 51 is a view illustrating the device of FIG. 44 flexibly mounted within an oil filled streamer;

FIG. 52 is a sectional view taken substantially along the line 52—52 of FIG. 51;

FIG. 53 is a sectional view taken substantially along the line 53—53 of FIG. 51;

FIG. 54 is an elevational view of the flexible plastic sleeve or shield in a stressed condition as used in connection with the device of FIG. 44;

FIG. 55 is an end view of the sleeve device of FIG. 54;

FIG. 56 is an elevational view partially in section and partially broken away of a geophone and gimbal mounting therefor;

FIG. 57 is a view of the device of FIG. 56 flexibly mounted within a detection streamer;

FIG. 58 is an enlarged sectional view of a particle velocity sensing device for use without a noise canceling device; and FIG. 59 is a view illustrating the device of FIG. 58 flexibly mounted within an oil filled streamer.

Referring now to the drawings on which like numerals of reference are employed to designate like parts throughout the several views and more particularly to FIG. 1 thereof, there is shown thereon in diagrammatic form a seismic surveying system employing the present invention in accordance with a preferred embodiment thereof, the system comprising a detector streamer generally indicated by the reference numeral 10 and composed of a plurality of oil filled sections 11 and towed by a vessel beneath the surface of the water. The streamer is provided with a lead-in or tow cable 12 payed out by a reel 13 for establishing a towing connection between the steamer and the vessel. There is also provided a float 14 towed by a length of line 15 secured at one end thereof to the vessel as at 16. A length of line such as the chain 17 connects the float to a collar 18 within which is disposed the trailing end portion of the tow cable 12 as more clearly shown on FIG. 9. The collar is provided with a downwardly projecting member 19 having an aperture 21 therein for effecting a connection to bridle 22 to support a heavy depressor 23 within the water. The collar 18 is preferably of two piece construction to facilitate attachment to the tow cable 12, the parts being held together as by bolts, rivets or the like disposed within bores 24.

Figure 4S:
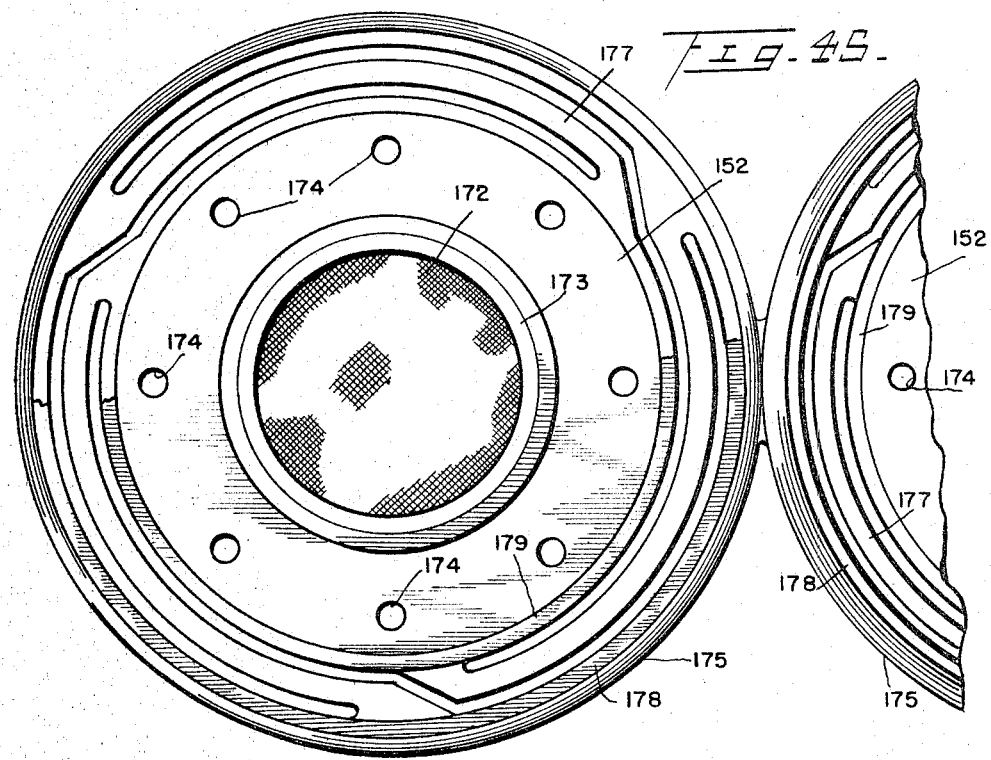
FIG. 4 is an enlarged sectional view and partially broken away of the head or leading section of the streamer of FIG. 1.
Figure 4B:
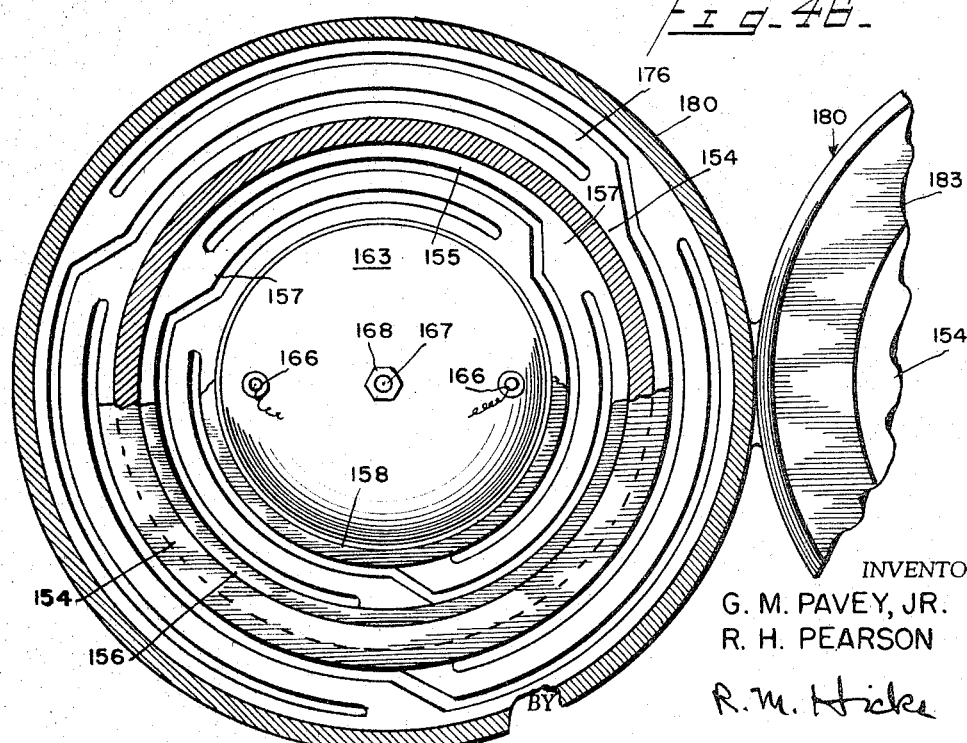

An arrangement is thus provided whereby the leading or head end of the streamer is towed at any predetermined depth controlled by the length of the chain 17. The depressor is provided with a trailing end portion 25 suspended by a line or length of chain 26 secured at one end thereof to a collar 27 encircling the tow cable 12. Each of the sections 11 comprises a length of flexible tubing composed of a plastic such as polyvinyl chloride and having the ends sealed as shown in FIGS. 4 and 5 to retain a quantity of oil therein.

Referring now specifically to FIG. 3 the tow cable comprises a length of flexible tubing such as a gasoline hose 28 within which is disposed a strain cable 29 having the trailing end enlarged as at 31 for enagement with a complementary socket formed within a spider 32 composed of metal suitable for the purpose such, for example, as zinc to which the tubing 28 is tightly clamped by the clamp 33. A packing box 34 is tightly fitted within the hose as by the clamps illustrated to seal the strain cable 29 and a plurality of signal conductors 35 arranged adjacent thereto. A length of neoprene tubing 30 preferably encloses the signal conductors as a protective jacket.

There is secured to the spider 32, as by the eye bolts illustrated, three equally spaced strain cables 36 of sufficient length to extend somewhat beyond the trailing end of the tow cable, each of the strain cables being formed in a looped portion snuggly encircling a thimble 37 clamped therein as by the neoprene sleeves illustrated on FIG. 34. Each of the thimbles carries an eccentric eyelet 38 by means of which the effective length of the strain cables may be adjusted at will by rotation of the eyelet within the thimble before the eyelet is securely clamped therein. A clamping link generally indicated by the numeral 39 is employed in connection with the eccentric eyelets for establishing a towing connection from each strain cable to the next succeeding strain cable. The signal conductors within the tow cable also extend beyond the trailing end of the tow line and terminate preferably in two or more multi contact jacks 41 for establishing an electrical connection to the signal conductors of the streamer when the plugs associated therewith engage the jacks.

The trailing end of the tow cable is clamped to an apertured adaptor 42, the adaptor being also clamped to one end of a short length of hose 43 which is clamped at the other end thereof to the leading end of the flexible sleeve of the first or leading section 11 of the streamer for effecting a watertight connection therebetween. A plurality of spacing elements 132 are arranged at intervals along the tow line substantially as shown on FIG. 3 to maintain the strain cables and signal conductors in proper spaced relation. Since the lead-in or tow cable, per se, forms no part of the present invention, a further description thereof is deemed unnecessary.

Referring now to FIG. 4 on which is shown a view somewhat in section and partially broken away of the head or leading detector section 11 of the streamer, the forward end thereof is fitted with a packing box 45. As more clearly shown on FIG. 29, this packing box is of generally cylindrical configuration and provided with a plurality of annular grooves 46 formed exteriorally therein for effecting an oiltight seal with the outer tubular member 47 of the streamer section when hose 43 is placed thereover and clamped by the clamps 48. The clamps 33 and 48 may be of any type suitable for the purpose such, for example, as a type known in the trade as a Punch-Lock clamp.

The packing box 45 comprises a tubular sleeve 49, FIG. 29, having a plurality of annular grooves 51 and a pair of annular recesses 52 formed therein. A pair of keeper rings 53 which may be of the spring lock type are set into the recesses 52. Abutting each of the keeper rings 53 is an aluminum spacer ring 54. A phenolic spacer element 55 abuts the rearmost ring 54 and a second phenolic spacer element 56 abuts the forward ring 54. A neoprene seal 57 is disposed between elements 55 and 56 and adapted to be compressed thereby sufficiently to force the seal 57 into sealing engagement with grooves 51 and to seal the signal conductors and strain cables 58 within the packing box. Each of the spacer elements 56 and 55 and the seal 57 is provided with suitable apertures through which the conductors and strain cables extend as shown on FIGS. 30, 31 and 33, respectively.

A tubular bolt 59 having a locking member 60 configured to seize the head thereof and doweled as at 61 to the spacer element 55 is assembled between the head of the bolt and the spacer element to prevent rotation of the bolt as nut 62 is tightened. A washer 63 is preferably assembled between nut 62 and the front spacer unit 56. Tightening the nut 62 compresses neoprene seal 57 into fluid tight engagement with the bolt in addition to effecting a sealing connection with the strain cables and conductors.

Prior to use in service the streamer section is filled with oil by attaching an oil fitting to the hollow bolt 59. When the streamer is filled with oil a steel ball 64 is placed on a tapered seat 65 formed within the bolt. Cap nut 70 is now threaded on the bolt and tightened sufficiently to draw the ball into firm sealing engagement with the seat and thereby seal the oil within the streamer.

The opposite end of the streamer is provided with a similar packing box constructed and arranged to seal the trailing end of the streamer section and the signal wires and strain cables extending therethrough. It is inserted into the streamer section in back-to-back relation with respect to the packing box 45 in the forward end of the streamer such that the streamer may be filled with oil from either end or, if desired, it may employ a solid bolt to clamp the parts together in lieu of the hollow bolt 59 whereby the section streamer is invariably filled from the forward end. When this has been done, a thin oil tube having a flattened end portion is inserted beneath the short hose 43 at an end portion thereof and the hose 43 is filled with oil, after which the oil tube is withdrawn and the clamps 48 are tightened. The strain cables 58 extend somewhat beyond the trailing end of the streamer section 11 and are provided with thimbles and eyelets as shown on FIGS. 34–36 for connection to the strain cables of the next succeeding section. The forward ends of these strain cables, in like manner, extend beyond the leading end of the streamer section and are similarly terminated for connection to the strain cables 36 of the tow cable or the preceding streamer section, as the case may be.

The signal conductors 66 extend through the rear packing box and terminate in a jack 67 for connection with multicontact plug 68 to establish an electrical connection to the conductors of the next succeeding section. Since each section employs a signal output circuit of two conductors extending to the amplifier and recording apparatus on the vessel, it will be clearly apparent that the number of effective signal conductors extending rearwardly from each section will coincide with the number of effective signal conductors extending forwardly from the next succeeding section and each section will have, in addition to its own pair of signal conductors, the pairs of signal conductors of all the following sections extending forwardly therefrom.

Each of the detector streamer sections carries a plurality of piezoelectric microphonic devices arranged at intervals throughout the length thereof for detecting variations in pressure of the surrounding water caused by seismic signals received from a subaqueous reflecting surface. These piezoelectric devices may be similar to the detecting devices more fully disclosed in the Paslay Patent 2,465,696 for Method and Means for Surveying Geological Formations and responsive to variations in pressure of oil or similar fluid with which the detector streamer is filled.

Referring now to FIGS. 12–15 of the drawings the pressure responsive detectors indicated generally by the numeral 69 may each comprise a cup-like metallic casing 80 having a stack of piezoelectric crystals 71 therein. The crystals are connected at the end surfaces thereof to a pair of insulating elements 72 and $72^1$ composed of material suitable for the purpose such, for example, as linen Bakelite to which the crystals are cemented. The bottom or end wall of the casing is provided with a pair of terminals 73 insulated therefrom as at 74 and having a pair of flexible conductors connected thereto for establishing an electrical connection to the crystal stack. Element $72^1$ is configured to avoid interference with terminals 73 and cemented to the bottom of the casing 80 for supporting the crystal stack therein. A thin flexible diaphragm 75 composed of metal such, for example, as Phosphor bronze or the like is bonded as by solder in sealed relation at the periphery thereof to the lip of the cup. This diaphragm is in contact with insulating element 72 whereby variations in fluid pressure applied to the exterior surface of the diaphragm cause pressure impulses to be applied to the crystal stack which generates electrical signals correlative with the pressure variations received by the diaphragm 75.

The casing is provided with a plurality of outwardly projecting metallic lugs 76 bonded exteriorly thereto substantially as shown for connection to the strain cables 58, the connection being made secure as by soldering the parts together.

Whereas the detector streamer sections may be of any desired length, it will be assumed for the purpose of description that the detector streamer herein illustrated is about 100 feet long having twenty pressure responsive detecting devices 69 disposed therein at uniform intervals throughout the length of the streamer and that the pressure detector 69 illustrated is the third such detector from the head or leading end of the streamer section.

The particle velocity detecting devices 77, herein called acoustically sensitive particle velocity phones, each includes a motion sensing unit indicated generally by the numeral 78, best shown on FIG. 21, the unit comprising a magnet assembly composed of an annular magnet 79 having a circular upper pole piece 81 and a hollow lower pole piece 82 configured substantially as shown and secured to the ends of the magnet in any suitable manner to provide a small annular air gap therebetween. The upper pole piece is provided with an annular upwardly projecting lip 83 to which is secured an annular flexible compliance member 84 in any suitable manner as by the clamping ring 85. Secured by compliance member 84 to the ring member 85 at the inner annular portion thereof is a thin rigid dome-like member 86 composed preferably of cloth and treated with a phenolic resin sufficiently to impart the desired degree of stiffness thereto, the dome member thus having both surfaces thereof directly exposed to acoustic waves and movable thereby at the particle velocity of the wave impinging on the surface directly exposed thereto.

There is also secured to the dome member along a peripheral portion thereof a cylindrical tube 87 composed preferably of paper of .003" to .005" in thickness treated with a stiffener and carrying a wire coil or winding 88 wrapped thereabout and cemented thereto.

The coil is connected by a pair of flexible conductors 89 to a pair of terminals 91 for establishing an exterior electrical connection to the coil. An arrangement is thus provided whereby the coil is adapted to be moved vertically within the magnetic air gap in response to particle movement of the medium acting on opposite sides of the diaphragm, this movement preferably being facilitated by a plurality of perforations 92 arranged annularly within the compliance member 84. The perforations 92 also serve an additional function of venting chamber 93 as the diaphragm is moved. The bottom pole piece 82 is provided with a relatively large aperture extending axially therethrough whereby the diaphragm is responsive to waves approaching from either above or below. A plurality of bores 94 are formed within the bottom pole piece transversely in communication with this large aperture to equalize the pressure within chamber 95 with the pressure of the medium within the aperture.

The structure for mounting the unit 78 and maintaining it in a vertical position comprises a tubular casing 96 perforated as at 97 and provided with a plurality of outstanding ears 98 having holes therein within which the strain cables 58 are disposed. The casing is prevented from axial movement along the strain cables by a plurality of sleeves 99 swaged or otherwise secured to the strain cables. The sleeve or casing 96 is fitted with a pair of end plates 101 and 102 respectively disposed within the end portions thereof and retained in position by a plurality of screws 103 which may also advantageously be employed to secure the ears 98 to the casing. Each of the plates 101–102 is provided with a plurality of apertures 104 to allow the oil to completely fill the casing 96, and a central bore 105 to receive and retain a bearing member 106 which, as illustrated, may be a ball bearing. The motion sensing unit 78 is fitted within a support 107 and clamped securely thereto by screw 110 as illustrated.

A pair of bearing shafts 108 and 109 are fitted in mutually aligned relation within the support 107 and secured thereto as by the screws 111. The outer ends of the shafts are fitted within the ball bearings 106. The support 107 is provided with an aperture within which the motion sensing unit 78 is arranged and securely clamped as by the screw 110 such that the center of gravity of the unit 78 lies below the axis of rotation of the support and the unit, therefore, is maintained in a substantially vertical position as viewed on FIG. 18 while the streamer section is being towed within the water.

Shaft 109 is somewhat longer than shaft 108 and carries for rotation therewith a pair of slip rings or discs 113 and 114 insulated therefrom and engaged by brushes 115 and 116 respectively connected to terminals 117 and 118. The slip discs 113–114 are connected electrically to terminals 91 by short lengths of conductor as is well known in the electrical art. An arrangement is thus provided for establishing an external electrical connection to the coil winding 88 regardless of rotative or oscillatory movement of the particle velocity detector about the axis of rotation thereof. The signal wires extending throughout the length of the detector streamer may be conveniently grouped about the particle velocity detectors 77 as indicated on FIG. 17.

In the assumed example of a streamer employing streamer detector sections having twenty pressure responsive detecting devices therein an arrangement employing four particle velocity detectors placed one each near the 3rd, 8th, 13th and 18th pressure detectors from the head end has been found satisfactory.

Preferably though not necessarily, there is also provided a plurality of acoustically insensitive motionally responsive phone units designated generally by the numeral 119 employing the same motion sensing unit 78 as the acoustically sensitive particle velocity responsive units 77 but differing therefrom in the construction of the outer tubular casing 96. Whereas, it will be recalled, the casing 96 of the acoustically sensitive unit 77 was provided with a plurality of perforations 97 for allowing free wave movement in either vertical direction of the liquid transmitting medium within which the device is immersed corresponding in both magnitude and character to the particle velocity of an acoustic wave sensed by the device 77, the outer tubular casing of the motionally responsive device 119 is not perforated but, on the other hand, it is provided with an outer cylindrical acoustic shield 121 extending throughout the length of the casing in such a manner as to form an air filled chamber therebetween effective to cause reflection of an acoustic wave and thus prevent the acoustic wave from actuating the dome shaped member 86 and coil 88 connected thereto. The general construction of this shield member is shown on FIGS. 37-38 of the drawings. Although the acoustic shield encloses a chamber filled with air, it is to be understood that, if desired, noise absorbing material suitable for the purpose may be employed, as is well known in the acoustic art, to insulate the motion sensing mechanism from acoustic waves impinging on the outer cylindrical surface of the shield. The device thus is responsive only to unwanted signals due to motional disturbances to the same degree as the acoustic particle velocity detector 77 to the exclusion of an acoustic wave. The motional responsive devices are equal in number to the acoustic detectors and mounted within the detector streamer such that each motional responsive device is in closely spaced adjacency to a different acoustic detector 77 and connected in series opposition thereto. This arrangement provides a cancellation of the electrical signals generated by the particle velocity detectors in response to motional disturbances resulting from residual inertia effects and thus electrical signals corresponding thereto are excluded from the seismic output signals received from the detector streamer by apparatus on the towing vessel. These motional responsive detector devices 119 are herein referred to, for the foregoing reasons, as noise cancelling detectors.

Referring now to FIG. 37 there is shown thereon an alternative arrangement in which the particle velocity detector and noise cancelling detectors are mounted side-by-side on a single support 122 pivoted for rotative or oscillatory movement as heretofore described in regard to the support block 107. The coils of the motion sensing units 78 are series connected in opposition to the slip discs and thence to the pair of output terminals by the brushes and conductors illustrated. The end plates 101 and 102 are fitted within the end portions of an elongated casing or sleeve 123 and secured thereto and to ears 98 by a plurality of screws whereby the device is supported by the strain cables 58. The casing is provided with a plurality of apertures extending circumferentially thereabout opposite the particle velocity detector and an outer acoustic shield 121 about the noise canceling detector 119 which effectively prevents actuation of the dome member 86 of the noise canceling detector by an acoustic wave.

Referring now to FIGS. 22-25, a transformer 124 is connected to a plastic mounting 125 by a pair of screws 126. The mounting is preferably configured substantially as shown and provided with three apertures 127 for receiving the strain cables 58 and an enlarged opening for the insertion of a multicontact plug 128 which engages complementary slip connections formed in jack 129 secured to one end of the transformer. The transformer is positioned ahead of the pressure detectors near the forward or head end of the streamer section and lashed to the signal conductors adjacent thereto which are divided into two branches and extend along the transformer on opposite sides thereof as shown at 131, FIG. 23.

The transformer may be of any type suitable for the purpose such, for example, as a two winding transformer having a band pass frequency in excess of 45 cycles per second. Seismic reflected signals have been found to be within the frequency range of about 20 to 45 cycles per second and since the frequency of the reflected signals lies within the band pass frequency of the transformer no phase shift due to transformer action is encountered when the transformer is included in the output circuit of the detector streamer section.

The detector streamer section is also provided with a plurality of spacers or floats 132 arranged at intervals therein and connected to the strain cables 58 which pass through uniformly spaced apertures 133 formed in the floats. The floats are composed preferably of a material known in the trade as tyril plastic and are of generally cylindrical outer configuration snugly fitting within the streamer and provided with a central bore 134 within which the signal conductors are arranged, FIGS. 27-28. The float is composed of two parts bonded together along a transverse center line and provided with a cutaway portion 135 in communication with each of the apertures 133 for the introduction of a lump of molten solder of sufficient size to bond to the strain cables and prevent longitudinal movement of the float with respect thereto.

As most clearly shown on FIG. 26, each float is provided with a plurality of radial walls 136 communicating with a hollow hub in a manner to provide a plurality of sealed air chambers 137 and impart a relatively high degree of positive buoyancy thereto when the floats are immersed in oil. The floats are so arranged that a float is in closely spaced adjacency to both ends of each of the detectors within the streamer sections to avoid possible injury or damage to the detectors as the result of mechanical handling or winding upon a reel. A sufficient number of floats are employed to render the streamer substantially neutrally buoyant when submersed within the water. The term "neutrally buoyant" as employed herein, may be defined as a condition in which the weight of the fluid displaced by an object completely immersed therein is equal to the weight of the object.

On FIG. 5 is shown the trailing end detector streamer section 11 which differs from the other streamer sections in the provision of plug member 138 clamped in the end portion of the section. As best shown on FIG. 10, the plug comprises an interiorly projecting member 139 having three equally spaced faces 140 to which the ends of the strain cables 58 are secured as by the screws 141. The member 139 is secured to plug member 138 as by screws 142. The plug 138 is recessed preferably as shown to receive a swivel connection terminating in an eye bolt 143 to which a marker buoy may be secured as by line 144 to provide a visual indication of the position of the trailing end of the streamer within the water.

On FIG. 40 is shown in schematic form a circuit arrangement suitable for use with the present invention, the circuit including a transformer 124 having a primary winding 145 and a secondary winding 146. The primary winding is connected to a resistance 147 and the pressure responsive detectors 69 within the streamer section 11, all in parallel, the resistance being employed to smooth out the signal. One end of the secondary winding is connected to one conductor of the output circuit of the streamer and the other end of the winding is connected to the pairs of particle velocity detectors 77 and noise canceling detectors 119, all in series, from whence the circuit continues to the other conductor of the output circuit. The velocity and noise canceling detectors comprising a pair are connected together reversely, as shown on the circuit such that like signals generated by each of the detectors of the pair are canceled. In certain cases in which the noise cancellation feature is unnecessary or not desired, the noise cancelling detectors may be omitted and the secondary winding of the transformer, therefore, would be connected in series with the particle velocity detectors only.

A discussion of the circuit arrangement shown on FIG. 40 is believed to be in order. The velocity and noise cancellation detectors have been shown connected in series with the secondary winding of the transformer for the reason that the voltage sensitivity of these serially-connected detectors is about the same as the output voltage at the secondary winding due to the pressure detectors connected to the primary winding. If the sensitivity and impedance of the particle velocity detector were increased sufficiently, they could be connected in series with the high impedance pressure detectors and satisfactory results would be obtained. Also the velocity detectors may be connected in parallel with either the primary or secondary windings of the transformer if they possess the proper sensitivity and impedance and the system would operate satisfactorily to obtain the desired result. The pressure detectors possess, in general, both a high impedance and a high voltage output whereas the impedance and voltage output of the particle velocity sensing detectors are both relatively low.

Before describing in detail the seismic tracings or graphs shown on FIGS. 41, 42 and 43, a brief general discussion of the nature and character of seismic waves reflected from a subbottom layer and from the air-water interface in the order named is deemed to be appropriate for a better understanding of the invention.

When an underwater seismic signal is reflected from a subbottom layer it travels upwardly until it reaches the surface of the water at which time it experiences a strong reflection from the air-water interface with a 180° phase shift. This reflected signal travels downwardly through the water and acts on the underwater detector in such a phase relationship to the original signal as to tend to cancel it out. In prior systems of this character employing pressure type phones or detectors only such, for example, as the system of Patent 2,465,696 to L. C. Paslay supra, optimum results are obtained when the detector system was placed about 30 feet below the surface of the water corresponding to one quarter wave length or more of the seismic signal. Since with long detector streamers which may, in some cases, reach a length of 1720 feet, it is extremely difficult to maintain this predetermined depth of submersion throughout the entire length of the streamer, the fidelity of the recorded seismic signal received from the subbottom layer may be seriously impaired as the result of deterioration by the secondary reflected wave from the air-water interface as the detector streamer departs from the original submerged depth of 30 feet, practically total cancellation resulting, for example, when the streamer has moved too close to the surface of the water.

If, now, the seismic signal received through the water be regarded as an acoustical wave, the amplitudes of both the pressure and particle velocity waves are in phase. The term "amplitude" is employed herein for the reason that pressure, as is well known, is a scalar quantity while velocity is a vector quantity. Furthermore, for the purpose of description, it may be assumed that the particle velocity is in phase with the pressure wave at that point along the wave when the pressure is maximum. Waves coming from below the detector streamer are reflections from the subbottom strata and are desired to be recorded with maximum fidelity whereas waves from above are secondary reflections from the air-water interface and are undesirable since they represent destructive interference with the waves from below.

Referring now more specifically to FIG. 41 on which is shown both pressure and velocity waves approaching the detector streamer through the water first upwardly and then downwardly when the streamer is near the surface of the water and the output signal when these waves are detected and combined in accordance with the teaching of the present invention. Let it be assumed, by way of example, that the streamer is only ten feet below the water surface and that trace or graph A is the output of the pressure detectors in response to a wave reflected from the subbottom and approaching the detector streamer from below. This is the graph possessing the character of the seismic signal which it is desired to record with high fidelity.

Graph B is the output of the velocity detectors corresponding to the wave reflected from the subbottom. Since, as previously stated, the pressure and particle velocity amplitudes are in phase and the detectors are, in the assumed example, properly phased and have identical sensitivities, graph B will be identical with graph A both in time and character. The composite output of waves A and B is shown as graph C which differs from graphs A and B in amplitude only.

Graph D is the signal output of the pressure detector in response to a wave reflected from the air-water interface and approaching the streamer downwardly. This reflected wave, it will be noted, is 180° out of phase with the signal A due to the wave from below by reason of the fact that the pressure wave undergoes a 180° phase shift when reflection occurs at the air-water interface. It is clearly apparent, therefore, that if the streamer contained pressure detectors only, the output at this depth of submersion would be negligible.

Graph E is a trace corresponding to the output of the velocity detectors due to the reflected wave from above. This signal is in phase with the signal from below received by the velocity detectors for the reason that the particle velocity, upon reflection from the interface, undergoes a phase shift of 180° with respect to the direction of propagation. Since the direction of propagation, however, is also reversed, the reflected particle velocity wave is in phase with the original wave.

If, now, graphs A, B, D and E are added together, the composite graph or trace F results. This graph is identical in both character and time to the original graph A and is an important and distinct improvement over the graph obtained by the streamer employing pressure responsive devices alone when the streamer is operating just beneath the surface of the water for the reason that the character of the signal from below has not been altered by the signal from above. It is clearly apparent, from the foregoing, that the streamer of the present invention possesses a highly directional response characteristic.

On FIG. 42 is shown a series of graphs or traces generally similar to FIG. 41 and corresponding to a depth of submersion of the detector streamer of 30 feet. Graphs G and H are the outputs of the pressure and velocity detectors respectively in response to the upwardly approaching seismic wave of FIG. 41. The composite of graphs G and H is shown on graph I. The signal output, caused by the wave from above, is shown in graph J for the pressure detectors in graph K for the velocity detectors, graphs J and K being delayed somewhat owing to the increased distance and time of travel of the wave from the detectors to the interface and back again. The composite of waves shown on graphs G, H, J and K is shown on graph L which is identical in both time and character to graph I. Again, in the present case, it has been clearly shown that the signal output of the detector streamer has not been altered by the secondary wave from above.

If, in this assumed case, the detector streamer contained pressure detectors only, the output would be graph M which is the composite of graphs G and J added together. Graph M, it will be noted, is not like graph G (the original signal from below) in either time or character.

On FIG. 43 is shown a series of graphs generally similar to FIG. 42 and corresponding to a depth of submersion of the detecting streamer of 72 feet. Graphs N and O represent the outputs of the pressure and velocity detectors respectively in response to the upwardly approaching seismic wave of FIG. 41. The composite of graphs N and O is shown on graph P. The wave from above causes outputs shown by graph Q for the pressure detectors and by graph R for the velocity detectors. The addition of graphs N, O, P, Q and R results in graph S which is identical in both time and character with graph P. Thus, once again the signal output has the same character as it would have had, if there had been no wave from above. If the detector streamer had employed pressure detectors only, the output therefrom would be as shown on graph T which is the summation of graphs N and Q. The character of graph T, it will be noted, is quite different from graph M employing pressure detectors only at a depth of 30 feet.

Whereas on FIG. 40 there is shown a circuit for combining the outputs of the pressure and velocity responsive detectors located within a streamer comprising a wave detecting station to effect a composite output therefrom possessing high fidelity to the original seismic wave reflected upwardly through the water from a subbottom layer and which is undistorted in either time or character by a secondary wave reflected downwardly through the water from the air-water interface, this result may also be achieved by other circuit arrangements or other instrumentalities or, if desired, the composite graphs could be plotted by hand from the separate graphs of the pressure and particle velocity detectors respectively.

On FIG. 44 is shown an alternative structure for rendering the particle velocity sensing devices more sensitive to seismic acoustic signals reflected from subbottom strata and received through the surrounding water while a towing force is being applied to the detection streamer. When employing this device or the sensing device of FIG. 58, as the case may be, seismic signals of high quality may be received thereby while the detection streamer is under stress by reason of a towing force applied thereto by a moving vessel.

The particle velocity device of FIG. 44 comprises a particle velocity detector 148 generally similar to the particle velocity detector 78 of FIG. 21 interspersed with but differing therefrom in several important aspects both as to structure and means for mounting. The particle velocity detectors, like the detectors 78, are mounted at intervals intermediate the pressure responsive devices within the streamer.

The particle velocity detecting devices 148, each includes a magnet assembly composed of an annular magnet 149 having secured thereto means forming a circular upper pole piece 151 having a hollow lower pole piece portion 152 configured substantially as shown to provide a small annular magnetic air gap encircling the upper portion of the magnet.

The upper pole piece is provided with an annular upwardly projecting lip 153 adapted to receive and retain a complementary annular clamping ring 154 force fitted therewith. The clamping member 154 is provided with an annular recessed portion on the inner cylindrical surface thereof within which is disposed an outer peripheral portion of a thin circular spring 155, more clearly shown on FIGS. 46 and 48, and clamped thereto by ring member 156. The circular spring 155 is provided with a plurality of arcuately configured arms 157 to provide a relatively high degree of movement of the center portion of the spring with respect to the outer peripheral portion thereof. Secured to the inner circular portion of spring 155 as by the ring 158 is a circular coil mounting 159 having an annular portion depending therefrom to which is secured a coil of wire 161 for reciprocal movement within the magnetic air gap formed within the upper pole piece 151.

The coil mounting 159 has an upstanding hollow cylindrical portion 162 to which is secured as by cementing the parts together a thin rigid dome-like member 163 composed preferably of aluminum or cloth treated with a phenolic resin sufficiently to impart the desired degree of stiffness thereto.

The mounting 159 is provided with a pair of rib portions 164 each having an aperture extending longitudinally therethrough to receive a lead wire 165 and thereby establish an electrical connection from the coil 161 to a pair of terminal elements 166 insulated from each other and carried by the dome shaped member 163. The dome shaped member 163 is provided with an aperture at the central portion thereof to receive an end portion of rod 167 composed of material suitable for the purpose such, for example, as aluminum to which it is secured as by the nut 168 threaded thereon.

The lower end of rod 167 is provided with a shoulder for engagement with a complementary small aperture in the central portion of spiral spring 169 composed of thin flat metal and configured generally like spring 155. The outer peripheral portion of spring 169 is secured within an annular recess formed in member 152 and retained by ring 171 fitted within the recess. Ring 171 is provided with an inner circumferential portion within which is disposed a fine mesh screen 172 and retained therein as by ring 173 forced therein. The pole piece 151 is provided with a plurality of vents 174 for the passage of oil therethrough as the coil 161 moves within the upper air gap.

The particle velocity sensing device of FIG. 44 is mounted for limited vertical movement in either direction within a hollow cylindrical sleeve 175 by a pair of initially flat circular spring members 176–177 configured generally similar to spring 156. The outer portion of spring 176 is clamped within an upper recessed portion of sleeve 175 by annular member 180 and the inner portion is clamped to the pole piece 151 by clamping ring 154.

In like manner the outer end portion of spring 177 is clamped within a lower recessed portion of sleeve 175 by ring 178 and the inner portion of the spring is clamped within a lower recessed portion of pole piece 152 by ring 179. The inner cylindrical portion of sleeve 175 is provided with an annular rib or baffle member 181 extending radially inwardly therefrom and having an inside diameter slightly larger than the outside diameter of the pole piece 151. A complementary rib or baffle 182 extending radially outwardly from pole piece 151 and secured thereto at a point just above rib 181 is employed to provide viscous damping of the vertical movement of the particle velocity sensing device and additionally to provide a stop for downward movement thereof. Upward vertical movement of the particle velocity sensing device relative to sleeve 175 is limited by an inwardly extending portion 183 on annular member 180.

FIG. 44, it will be recalled, illustrates both a particle velocity sensing and a noise canceling device according to an alternative form of the invention, both devices being substantially identical in structure and each yieldably mounted within a sleeve 175 respectively associated therewith. To provide a gimbal mounting for these devices it has been found advantageous to join the two sleeves 175 as by silver soldering the parts together along their common line of contact in the position substantially as shown on FIGS. 44, 45 and 46 whereby both devices are adapted to rotate or oscillate about an axis within a common casing indicated generally by the numeral 184. The casing is provided with a plurality of apertures covered with a cylinder 170 composed of plastic suitable for the purpose, such, for example, as neoprene through which the particle velocity component of the seismic acoustic wave is transmitted and sensed by the particle velocity sensing device disposed adjacent the apertured window thus formed. The noise canceling device is encircled by an acoutic baffle or shield similar to the outer shield 121 of FIG. 37. Casing 184 is preferably provided with an end portion 185 formed integrally therewith and threaded at the opposite end for threaded engagement with an end cap 186, the seal therebetween being effected by gasket 190. The end portion 185 of the casing is provided with a sleeve bearing member 187 secured thereto in alignment with a bearing 188 formed in end cap 186 when the parts are fully assembled. A bearing member 189 is secured to sleeve 175 substantially as shown and provided with a centrally disposed aperture in communication with the interior of casing 184.

A length of flexible plastic tubing 191 is clamped to the outwardly projecting portion of sleeve bearing 187 and fitted with a stopper 192 to which the tubing is clamped as shown thereby providing an expansible sealed chamber to reduce the internal pressure effects of the casing 184 sufficiently to prevent damage to the casing or the devices disposed therein as the result of temperature changes in the ambient medium in contact therewith.

The bearing member 193 is secured to sleeve 175 of the noise canceling device in a manner to provide a gimbal support for the noise canceling and particle velocity devices.

There are also provided a pair of slip rings or discs insulated from bearing member 193 and from each other connected to the coils in series opposing relation. These slip rings cooperate with a pair of brushes respectively in engagement therewith to which a pair of conductors are connected for establishing an electrical connection to the device in a manner similar to the arrangement of FIG. 37. A plurality of terminals 194 each insulated from and carried by a metallic terminal block 200 attached to the sleeves 175 in any suitable manner as by silver soldering the parts together are preferably provided for facilitating and maintaining electrical connections between the movable coils and slip rings. The casing 184 is filled with oil through tubing 191 and sealed by stopper 192 clamped in sealing position as by the clamp illustrated.

The means for flexibly mounting the device of FIG. 44 within a flexible oil filled streamer will now be described with particular reference to FIG. 51 on which is shown casing 184 carried within a flexible plastic sleeve 195 with the flexible tube 191 extending through an axially disposed aperture 196 of an adjacent spacer element 197 which is of sufficient size to encircle and allow entry of the flexible tube 195 with the electrical conductors arranged longitudinally thereabout, FIGS. 51 and 53.

The flexible tube 195 is of just sufficient inside diameter to allow the insertion of casing 184 therein and is initially slightly longer than the distance between two adjacent spacers 197 whereby when placed therebetween the end portions of the flexible tubular support or sleeve 195 are flared outwardly as most clearly shown on FIGS. 54–55. The plastic sleeves 195 are each provided with three equidistantly spaced arcuately slotted end portions 198 within which the strain cables 199 are respectively disposed, FIGS. 51–52 and three somewhat larger equidistantly spaced slotted end portions 201 within which the electrical conductors are disposed and extend longitudinally between the plastic sleeve and the flexible streamer tubing from whence they are grouped together and pass through the central aperture 196 of the adjacent spacer elements 197. As clearly shown on FIG. 51, the wires disposed about flexible tubing member 191 are preferably lashed thereto at that portion of the tubing member extending outwardly beyond the spacer.

The spacer 197 is generally similar to the spacer 132 and, like spacer 132, is composed preferably of a material known in the trade as tyril plastic. The spacer 197 has an outer configuration generally in accordance with the configuration of spacer 132 but the central aperture thereof may be of slightly larger diameter than the central aperture of spacer 132. Like spacer 132 it is provided with a plurality of apertures 202 for the introduction of a lump of solder of sufficient size to bond to the strain cables and prevent longitudinal movement of the spacer with respect thereto.

Whereas in the illustrated embodiment of the invention the spacers 132 and 197 are shown as comprising two complementary portions, each provided with a plurality of internal ribs and cemented together to form a plurality of air chambers therein to increase the buoyancy thereof, the spacers may, if desired, be perforated to admit the entrance of oil into the chambers in lieu of air, or on the other hand, the spacers may be made solid throughout and, therefore, more resistant to damage in service. If the spacers are either oil filled or solid, as the case may be, the loss of buoyancy may be compensated for by a slight increase in the diameter of the flexible detection streamer.

FIG. 58 illustrates a particle velocity sensing device 203 similar to the particle velocity sensing device of FIG. 44 gimbal mounted within a metallic casing 204 having a base 205 and end cap 206 fitted to the other end portion thereof and secured thereto as by the threads 207, gaskets 220 preferably being employed to effect an oil tight seat therebetween. Both the moving coil and permanent magnet elements are individually spring mounted for limited vertical movement as in the case of the particle velocity sensing device of FIG. 44. In view of the similarity of structure of the device of FIG. 55 with the particle velocity sensing device of FIG. 44 a further detailed description thereof is deemed unnecessary. It should be noted, however, that in the absence of a noise canceling device, the particle velocity sensing device of FIG. 58 is provided with two gimbal bearing shafts secured on diametrically opposite sides of the outer sleeve 208 rotatable within complementary sleeve bearings on the base 205 and end cap 206 respectively to provide a gimbal mounting for the device. As in the device of FIG. 44, a sufficient quantity of oil is introduced into the casing through flexible tube 191 to fill the casing, the oil being sealed therein by stopper 192. The casing is also provided with a plurality of perforations about the cylindrical portion thereof and covered with a snug fitting plastic sleeve 170 similar to the arrangement of FIG. 44.

On FIG. 59 is shown the device of FIG. 58 flexibly mounted within an oil filled underwater detection streamer by a plastic sleeve 209 configured similar to the plastic sleeve 195 of FIGS. 44 and 54 and wedged between two adjacent spacers 197. A structure is thus illustrated and described in which the particle velocity sensing device comprises a spring mounted coil movable vertically in either direction within a magnetic air gap with a dome shaped driving element secured thereto which is highly responsive at all times to the particle velocity of an acoustic seismic wave acting on the coil driving element, the relatively heavy magnetic structure being also spring mounted within a supporting sleeve and disposed within an oil filled casing having means for establishing particle velocity communication from the exterior to the interior thereof, the supporting sleeve carrying means providing a damping action for limited vertical movement of the magnetic structure with respect thereto, and a flexible tubular mounting yieldably supporting the entire device within an oil filled detection streamer and effective to impart a high degree of sensitivity to the particle velocity sensing device at all times regardless of a towing force applied to the detection streamer.

A standard geophone, such for example, as the geophone 211 of FIG. 56 may be employed, if desired, with the system of the present invention. In this structure the geophone 211 is clamped within a mounting 212 by screw 213 and pivoted for rotation substantially as shown within an air filled casing 214, although if desired, a small quantity of oil may be introduced into the casing to provide damping of oscillatory movement of the geophone about the gimbal bearings. The casing 214 is preferably cylindrical in configuration and comprises a thin cylindrical wall having a somewhat thicker base portion 215 and threaded at the opposite end thereof to receive and retain a cap 216 threaded thereto and compressing gasket 220 to effect an airtight seal. Mounting 212 carries a bearing shaft 217 fitted for rotative movement within the base 215, and a second somewhat longer shaft 218 fitted on the opposite side of the geophone in alinement with shaft 217 adapted to coact with a sleeve bearing in cap 216 and provide a rotative support for the geophone.

A pair of slip rings 219 carried by shaft 218 are respectively connected to the output terminals of the geophone and coact with a pair of brushes 221 carried by cap 216 and insulated therefrom, means such as the pair of terminals 222 being connected thereto for providing an external electrical connection to the device.

The casing 214 is fitted within a flexible plastic sleeve or support 223, FIG. 57, generally similar to the support 195 of FIG. 51 and abutting adjacent spacers 197 within the detector streamer substantially as shown.

Since the present invention is suitable for use with streamers employing a plurality of pressure sensing acoustic transducers as pickup units in a long oil filled neutrally buoyant hose for sensing underwater seismic signals regardless of the depth of submersion of the streamer within the water, it is also well adapted for use with the system disclosed and claimed in Patent 2,729,300 to L. C. Paslay et al. for Water Borne Means for Making Seismic Surveys in which the streamer is towed along the bed of the body of water in closely spaced adjacency thereto. In this system the depth of submersion of the streamer varies with the depth of the bottom as the streamer moves along during a towing operation. This system possesses an advantage over the system of the Paslay Patent 2,465,696 residing in the fact that the bottom towed streamer avoids lateral drift or side motion of the streamer due to water movement caused by surface tides or cross currents.

By employing the particle velocity detectors described and claimed herein and the flexible plastic sleeve mountings therefor within an oil filled detection streamer adapted to be towed in a submerged condition within the water, an increase in sensitivity to the reception of the particle velocity component of acoustic seismic waves reflected from subbottom strata is achieved such that a satisfactory seismic chart may be recorded therefrom while the towing force is being applied to the streamer.

Whereas the invention has been described with particular reference to a preferred embodiment thereof which gives satisfactory results, it will be understood by those skilled in the art to which the invention pertains, after understanding the invention, that various changes and modifications may be made and various instrumentalities may be employed without departing from the spirit and scope of the invention and it is our intention, therefore, in the appended claims to cover all such changes, modifications and instrumentalities.

What we claim as new and desire to secure by Letters Patent of the United States is:

1. A waterborne seismic prospecting system for subaqueous geological structures comprising, in combination,
   (1) an oil filled flexible elongated neutrally buoyant streamer adapted to be towed at various depths of submersion beneath the surface of a body of water,
   (2) a plurality of pressure responsive detectors disposed at intervals within the streamer throughout the length thereof for producing an output electrical signal correlative with the character of a seismic wave reflected from subbottom strata beneath the streamer,
   (3) means within the streamer for erasing the electrical signal generated by the pressure responsive detectors and caused by a secondary seismic wave reflected downwardly from the surface of the water and impinging on the streamer at each of said depths of submersion, said erasing means comprising,
      (a) a plurality of vertically mounted particle velocity detectors each having means including an annular magnet resiliently mounted within and supported by a like number of gimbal supported sleeves and forming a circular magnetic air gap,
      (b) a movable annular wire coil,
      (c) means for resiliently supporting said coil by said magnet means in a manner to allow a reciprocal movement of the coil within said air gap, and
      (d) a dome shaped diaphragm secured to said coil supporting means for causing reciprocal movement thereof in response to the instantaneous particle velocity of an acoustic wave applied thereto,
   (4) a signal output circuit, and
   (5) means connecting said pressure responsive devices and said particle velocity detectors electrically in said output circuit in a manner to generate a voltage signal of equal and opposite polarity to the signal generated by the pressure responsive detectors in response to a secondary wave acting on the streamer while the streamer is being towed through the water,
   (6) the means resiliently mounting said annular magnet means within the gimbal supported sleeves including a pair of spring members respectively connected to and encircling the annular magnet means at the upper and lower portions thereof and having the outer peripheral portions of the springs connected to said gimbal supported sleeve at respective upper and lower portions thereof, and
   (7) a pair of annular baffle devices respectively connected to said annular magnet means and said gimbal supported sleeves to restrict the flow of oil therebetween as the sleeve moves relative to said magnet sufficiently in response to a particle velocity wave applied to said streamer.

2. A seismic prospecting system according to claim 1 including
   (1) an oil filled casing within which said gimbal supported sleeve is disposed,
   (2) an expansible oil filled chamber secured to said casing in communication with the interior thereof, and in which
   (3) the means for resiliently supporting said coil comprises
      (a) an annular coil mounting having the inner portion thereof connected to a circular spring member and the outer portion of the spring member connected to said magnet means,
      (b) a rod depending from said dome shaped member and extending through said annular magnet coaxially therewith, and
      (c) a second circular spring member connected at the central portion thereof to the lower end portion of said rod and at the outer peripheral portion thereof to the lower portion of said magnetic means.

3. The oil filled streamer of claim 1 including
   (1) a plurality of closely fitting apertured spacer elements arranged at fixed intervals therein,
   (2) a plurality of flexible plastic tubular mountings, each arranged coaxial with said streamer and snugly fitted between an adjacent pair of said spacer elements sufficiently to cause the end portions of said tubular mountings to be flared outwardly, and
   (3) a plurality of vertically mounted particle velocity detectors, each fitted within and flexibly carried by a different one of said tubular mountings.

4. An oil filled detector streamer according to claim 3 which includes
(1) an additional plurality of noise canceling devices secured respectively to said vertically mounted particle velocity detectors, each pair of noise canceling devices and particle velocity detectors being rotatable on a common pair of gimbal bearings,
(2) a plurality of cylindrical oil filled casings within each of which a different pair of noise canceling devices and particle velocity detectors are gimbal mounted for rotation about the axis thereof,
(3) a tubular acoustic shield on each of said casings encircling said noise canceling device disposed therein,
(4) a flexible plastic tubular mounting encircling and flexibly supporting said casing and acoustic shield,
(5) and means for connecting contiguous pairs of said noise canceling devices and particle velocity detectors in said signal output circuit in voltage opposing relation.

5. An oil filled detection streamer according to claim 4 in which the means for connecting said noise canceling devices and particle velocity detectors in said output circuit includes
(1) a pair of metallic slip ring elements disposed within each of said casings and rotatable with said particle velocity detectors and noise canceling devices, and
(2) a pair of brush elements slidably engaging each pair of said slip ring elements respectively and carried by an end portion of the respective oil filled casing.

6. An instantaneous particle velocity sensor comprising,
(1) annular magnetic means forming a circular magnetic air gap,
(2) a circular coil of wire configured for reciprocal movement within said air gap,
(3) means for mounting said coil of wire for movement within said air gap,
(4) a rigid diaphragm secured to said coil mounting means for imparting movement thereto in response to the instantaneous velocity component of an acoustic seismic wave acting thereon,
(5) a cylindrical oil filled casing having an acoustic window on the outer cylindrical portion thereof within which said particle velocity sensor is disposed,
(6) a gimbal mounting carried interiorly of said casing by the end portions thereof and pivoted for rotative motion about an axis coincidental with the axis of said casing,
(7) means for yieldably supporting said annular magnetic means by said gimbal mounting, and
(8) means secured to said annular magnetic means for yieldably supporting said coil mounting means for movement by said rigid diaphragm variably in accordance with the velocity component of an acoustic seismic wave sensed thereby,
(9) the means secured to said magnetic means for yieldably supporting said coil comprising, a circular spring secured to said coil mounting means and to an upper portion of said magnetic means,
(10) a second circular spring secured to a lower portion of said magnetic means coaxially with the first named circular spring, and
(11) a light rigid rod arranged coaxially within said annular magnetic means intermediate said rigid diaphragm and said circular spring and having the end portions thereof connected respectively thereto.

7. A particle velocity sensor according to claim 6 in which said annular magnetic means comprises,
(1) an annular permanent magnet having a pole piece secured to the lower portion thereof and an upstanding circular portion on said pole piece forming said magnetic air gap, and
(2) a plurality of vents arranged circumferentially in the lower portion of the pole piece to facilitate movement of said coil within said air gap.

8. A particle velocity sensor according to claim 7 including,
(1) a fine mesh screen secured to the lower portion of said annular magnetic means and enclosing the space within said annular magnet to provide viscous damping of the movement of said wire coil within said air gap.

9. A particle velocity sensor according to claim 8, including,
(1) an elongated flexible and expansible oil filled tubular member secured to said casing in communication with the interior thereof to reduce the internal pressure effects of the casing sufficiently to prevent damage to the casing as the result of variations in the temperature of the ambient medium in contact therewith, and
(2) means including a stopper for sealing the outer end of said expansible tubular member when the casing and member have been filled with oil.

10. A particle velocity sensor according to claim 7 in which
(1) the rigid diaphragm secured to said coil mounting is dome shaped and composed of aluminum and carries a pair of insulated electrical terminals on diametrically opposite sides thereof and extending therethrough, and
(2) said coil mounting means includes a pair of hollow rib members disposed adjacent said pair of electrical terminals respectively and,
(3) a pair of flexible insulated conductors connecting the ends of said coil of wire respectively to said terminals and disposed respectively within said hollow rib members.

11. A particle velocity sensor according to claim 9 comprising,
(1) a pair of slip rings secured to said gimbal mounting and rotatable with said particle velocity sensor,
(2) conductor means connecting said electrical terminals to said slip rings respectively,
(3) a pair of brushes on one end of said casing contacting said slip rings respectively, and
(4) means including a second pair of terminals extending through said one end of said casing and connected to said brushes for establishing an external electrical connection to said coil of wire.

12. An instantaneous particle velocity sensor according to claim 11 including
(1) a flexible plastic sleeve of greater length than the length of said casing within which the casing is fitted for flexible support thereby, and
(2) means axially compressing and supporting the end portions of said plastic sleeve.

13. A particle velocity sensor according to claim 12 in which the compressing and sleeve supporting means comprises
(1) a pair of generally cylindrical spacer elements held in fixed positions within an oil filled detection streamer and each having an aperture axially disposed therein,
(2) a plurality of signal conductors extending through the apertures of said pair of spacer elements and flared radially outwardly in three branches upon emergence therefrom, and
(3) three equidistantly spaced arcuate guide portions formed on each end of said flexible plastic sleeve, each guide portion being of sufficient size to receive a different branch of conductors upon emergence from one of said spacer elements and guide the branch externally of said plastic sleeve and within the detection streamer to a corresponding guide portion on the opposite end of the plastic sleeve.

14. A combination particle velocity sensing device and fortuitous noise canceling device for a seismic signal detecting streamer having a plurality of fixed spacer elements therein and comprising,
   (1) a particle velocity sensing unit and a noise canceling unit substantially identical therewith, said units being connected rigidly together and mounted on a common gimbal mounting within a detection streamer,
   (2) a cylindrical oil filled casing having a pair of end portions supporting the gimbal mounting for rotation about an axis coaxial with the axis of said casing,
   (3) a flexible plastic covered multi-apertured acoustic window encircling and in registration with a multi-apertured portion of the cylindrical portion of the casing within which the particle velocity sensing unit is disposed,
   (4) an acoustic shield surrounding the remaining cylindrical portion of the casing within which the noise canceling unit is disposed,
   (5) a flexible oil filled expansible chamber in communication with the interior of said casing to prevent damage thereto as the result of thermal expansion caused by an increase in the temperature of the ambient medium in contact therewith, the noise canceling unit and particle velocity sensing unit each comprising,
   (6) an annular magnet having an upstanding annular pole piece secured to a lower portion thereof and providing a vertically disposed annular magnetic air gap about the magnet, the upper portion of the pole piece being configured inwardly to form a stop,
   (7) means including a pair of circular spring devices for yieldably supporting the annular magnet on the common gimbal mounting,
   (8) a coil of wire constructed and arranged for movement within said air gap,
   (9) means for mounting said coil of wire and configured to engage said stop when a predetermined degree of upward movement thereof has been effected,
   (10) a rigid dome shaped diaphragm secured to said coil supporting means for imparting movement to said coil within the air gap,
   (11) means including a first circular spring connected at the central portion thereof to said coil mounting and a second circular spring connected at the central portion thereof to said diaphragm, the outer peripheral portions of said first and second springs being connected to said pole piece for supporting the coil movably within said air gap,
   (12) a pair of slip ring elements secured to said gimbal mounting and rotatable therewith,
   (13) means connecting the coils of the particle velocity device and the noise canceling device in series voltage opposing relation to said slip rings,
   (14) means including a pair of brush element carried by one of said end portions of the casing and engaging said slip rings for establishing an external electrical connection to the device, and
   (15) a flexible tubular sleeve of greater length than the length of said casing within which the casing is snugly fitted and flexibly supported within an oil filled detection streamer as the ends of the tubular sleeve are wedged between a pair of fixed spacer elements within the streamer.

15. The combination sensing device of claim 14 including,
   (1) a light rigid rod connected to the central portion of said dome-shaped diaphragm and the central portion of said second circular spring to establish a rigid connection therebetween.

16. The combination sensing device of claim 15, including,
   (1) a fine mesh screen covering the lower aperture within said pole piece to restrict the flow of oil therethrough and to provide a damping action to the movement of said coil of wire within said magnetic air gap.

17. The combination sensing device of claim 15 including
   (1) a pair of annular sleeve members carried by said common gimbal mounting within which the annular magnets of the particle velocity and noise canceling units are respectively arranged and to which the outer peripheral portions of the circular spring devices respectively disposed therein are secured for yieldably supporting the annular magnets, and
   (2) means comprising a pair of complementary annular elements carried by each of said sleeve members and said annular pole pieces respectively for restricting the flow of oil therebetween and thereby effecting a damping action to the movement of the annular magnets relative to the sleeve members, the complementary annular members being positioned in a manner to collide and provide a stop arresting further downward movement of the magnet structure with respect to said sleeve member when the magnet structure has traveled a predetermined distance with respect thereto.

References Cited by the Examiner

UNITED STATES PATENTS

| | | | |
|---|---|---|---|
| 1,847,702 | 3/1932 | Thuras. | |
| 2,465,696 | 3/1949 | Paslay | 340—7 X |
| 2,590,531 | 3/1952 | McLoad | 340—7 |
| 2,740,945 | 4/1956 | Howes | 340—15.5 |

BENJAMIN A. BORCHELT, *Primary Examiner.*

SAMUEL FEINBERG, *Examiner.*

P. A. SHANLEY, *Assistant Examiner.*